United States Patent
Lee et al.

(10) Patent No.: US 9,622,218 B2
(45) Date of Patent: Apr. 11, 2017

(54) METHOD AND SYSTEM FOR MANAGING CHANNEL IN WIRELESS LOCAL AREA NETWORK

(71) Applicant: Electronics and Telecommunications Research Institute, Daejeon (KR)

(72) Inventors: Jae Seung Lee, Daejeon (KR); Hyoung Jin Kwon, Daejeon (KR); Min Ho Cheong, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 149 days.

(21) Appl. No.: 14/564,032

(22) Filed: Dec. 8, 2014

(65) Prior Publication Data

US 2015/0163769 A1 Jun. 11, 2015

(30) Foreign Application Priority Data

Dec. 9, 2013 (KR) .......... 10-2013-0152332
Dec. 3, 2014 (KR) .......... 10-2014-0172422

(51) Int. Cl.
*H04W 72/04* (2009.01)
*H04W 84/12* (2009.01)
*H04W 28/16* (2009.01)
*H04W 24/02* (2009.01)

(52) U.S. Cl.
CPC .......... *H04W 72/04* (2013.01); *H04W 24/02* (2013.01); *H04W 28/16* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2006/0251013 A1 | 11/2006 | Roy et al. | |
| 2006/0258350 A1* | 11/2006 | Roy .......... | H04W 36/0061 455/435.1 |
| 2010/0202391 A1 | 8/2010 | Palanki et al. | |
| 2012/0114056 A1 | 5/2012 | Jafarkhani et al. | |
| 2013/0142068 A1 | 6/2013 | Marinier et al. | |

(Continued)

FOREIGN PATENT DOCUMENTS

KR 10-2013-0071397 A 6/2013

OTHER PUBLICATIONS

Krishna Gomadam et al., "Approaching the Capacity of Wireless Networks through Distributed Interference Alignment", arXiv:0803.3816v1 [cs.IT], Mar. 26, 2008, pp. 1-10.

*Primary Examiner* — Diane Lo

(57) ABSTRACT

A method and system for managing a channel in a wireless local area network is disclosed. The method includes detecting adjacent access points, transmitting a resource allocation request frame including candidate channel information which the first access points wants to a master access point among the detected adjacent access points, receiving a resource allocation response frame which is a response with respect to the resource allocation request frame from the master access point, and configuring the BSS based on channel related information included in the resource allocation response frame. Accordingly, performance of the wireless local area network can be improved.

20 Claims, 16 Drawing Sheets

(56) References Cited

U.S. PATENT DOCUMENTS

| | | | |
|---|---|---|---|
| 2013/0242965 A1* | 9/2013 | Horn | H04W 24/10 370/338 |
| 2014/0213249 A1* | 7/2014 | Kang | H04W 28/18 455/434 |

* cited by examiner

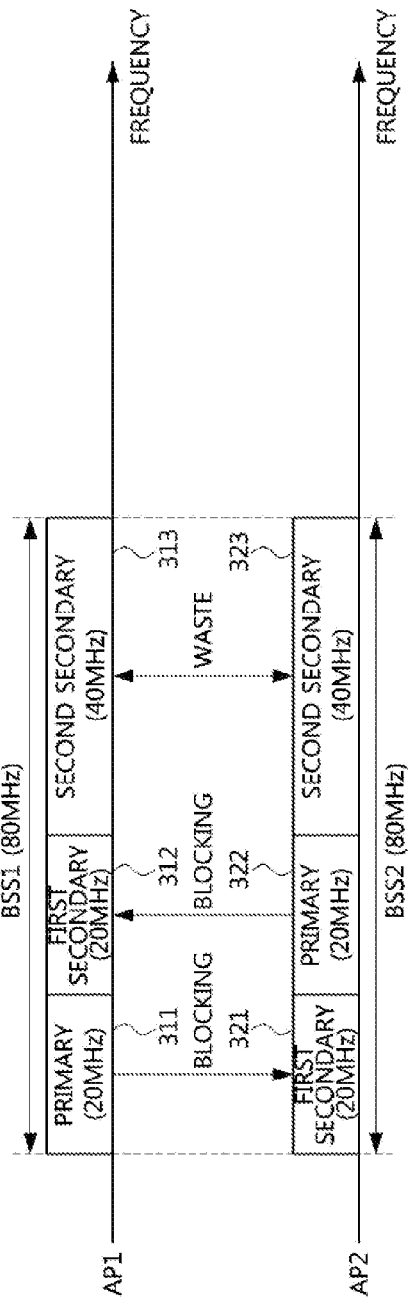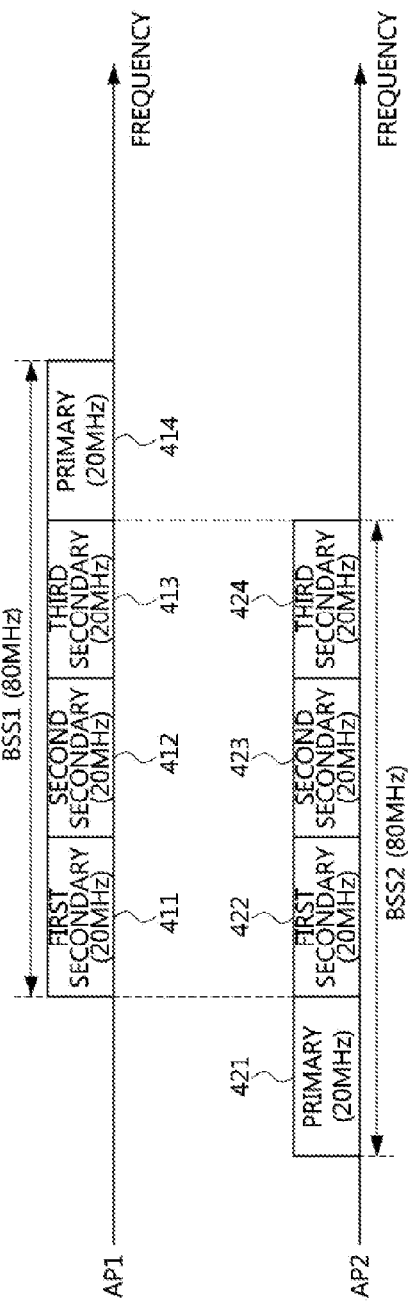

METHOD AND SYSTEM FOR MANAGING CHANNEL IN WIRELESS LOCAL AREA NETWORK

CLAIM FOR PRIORITY

This application claims priority to Korean Patent Application No. 2013-0152332 filed on Dec. 9, 2013 and No. 2014-0172422 filed on Dec. 3, 2014 in the Korean Intellectual Property Office (KIPO), the entire contents of which are hereby incorporated by reference.

BACKGROUND

1. Technical Field

Example embodiments of the inventive concept relate in general to a wireless local area network (WLAN), and more specifically, to technology of allocating and changing a channel by considering interference with respect to an adjacent basic service set (BSS).

2. Related Art

Various wireless communication technologies are being developed with developments of information communication technology. Among them, wireless local area network (WLAN) technology is technology to allow a mobile terminal such as a personal digital assistant (PDA), a laptop computer, a portable multimedia player, a smart phone, a tablet personal computer (PC), etc. to connect to an Internet wirelessly in homes and businesses, or a specific service provision area based on radio frequency technology.

A standard of the WLAN technology is being developed as an Institute of Electrical and Electronics Engineers (IEEE) 802.11 standard. The WLAN technology according to an IEEE 802.11a standard operates based on an orthogonal frequency division multiplexing (OFDM) method, and provides a transmission speed of maximum 54 Mbps in a band of 5 GHz. The WLAN technology according to an IEEE 802.11b standard operates based on a direct sequence spread spectrum (DSSS) method, and provides a transmission speed of maximum 11 Mbps in a band of 2.4 GHz. The WLAN technology according to an IEEE 802.11g standard operates based on the OFDM method or the DSSS method, and provides a transmission speed of maximum 54 Mbps in the band of 2.4 GHz.

The WLAN technology according to an IEEE 802.11n standard operates in the bands 2.4 GHz and 5 GHz based on the OFDM method, and when using a multiple input multiple output-OFDM (MIMO-OFDM) method, provides a transmission speed of maximum 300 Mbps with respect to four spatial streams. The WLAN technology according to the IEEE 802.11a standard supports a channel bandwidth of maximum 40 MHz, and in this case, provides a transmission speed of maximum 600 Mbps.

As spread of the WLAN is activated and various applications using the same are developed, necessity with respect to a new WLAN is being increased in order to support a greater throughput than a data processing speed in which the IEEE 802.11n standard supports. Very high throughput (VHT) WLAN technology is one of IEEE 802.11 technologies which are being offered for supporting a data processing speed which is equal to or more than 1 Gbps. Among them, an IEEE 802.11ac is being developed as a standard for providing the VHT at a band which is equal to or less than 5 GHz, and an IEEE 802.11ad is being developed as a standard for providing the VHT at a band of 60 GHz.

As use of the WLAN is recently increased, a possibility of using an overlapping channel between adjacent access points (or, adjacent basic service sets (BSSs)) is being increased. Since the overlapping channel between the adjacent access points is used, there is a problem in that performance of the WLAN deteriorates.

SUMMARY

Accordingly, example embodiments of the inventive concept are provided to substantially obviate one or more problems due to limitations and disadvantages of the related art.

Example embodiments of the inventive concept provide a method of allocating a channel so that interference between adjacent basic service sets (BSSs) is minimized.

Example embodiments of the inventive concept also provide a method of changing a channel so that interference between adjacent BSSs is minimized.

In some example embodiments, a method of establishing a basic service set (BSS) performed at a first access point, the method of configuring the BSS includes, detecting adjacent access points, transmitting a resource allocation request frame including candidate channel information which the first access points wants to a master access point among the detected adjacent access points, receiving a resource allocation response frame which is a response with respect to the resource allocation request frame from the master access point, and configuring the BSS based on channel related information included in the resource allocation response frame.

The detecting of the adjacent access points may includes, transmitting a probe request frame, and receiving a probe response frame including at least one among an identifier, operating channel information, primary channel information, and information indicating whether to operate as the master access point of the adjacent access point as a response with respect to the probe request frame from the adjacent access point.

The detecting of the adjacent access points may further include receiving a beacon frame including at least one among an identifier, operating channel information, primary channel information, and information indicating whether to operate as the master access point of the adjacent access point from the adjacent access point.

The candidate channel information may include at least one among operating channel information, primary channel information, and center frequency information which the first access point wants.

The channel related information may include at least one among operating channel information, primary channel information, and center frequency information of the first access point determined by the master access point.

In other example embodiments, a method of reallocating a channel performed at a first access point, the method of reallocating the channel include, receiving an inter BSS measurement request frame requesting interference measurement with respect to an adjacent BSS from a second access point, requesting the interference measurement with respect to the adjacent BSS to at least one terminal connected to the first access point, receiving interference information with respect to the adjacent BSS measured from the at least one terminal, and transmitting an inter BSS response frame including the interference information with respect to the measured adjacent BSS to the second access point.

The inter BSS measurement request frame may include identification information of an arbitrary access point establishing the adjacent BSS.

The interference information with respect to the adjacent BSS may include at least one among interference information with the arbitrary access point establishing the adjacent BSS and interference information with respect to at least one terminal included in the adjacent BSS.

The interference information with respect to the adjacent BSS may include at least one among an average received channel power indicator (RCPI) and an average receive signal to noise indicator (RSNI) with respect to the adjacent BSS.

The interference information with respect to the adjacent BSS may include at least one among an RCPI with respect to the adjacent BSS which is more than a predetermined RCPI level and an RSNI with respect to the adjacent BSS which is more than a predetermined RSNI.

The method of reallocating the channel may further include, transmitting a resource allocation request frame requesting channel reallocation to the second access point, receiving a resource allocation response frame including reallocated channel related information based on the interference information with respect to the adjacent BSS from the second access point, and reallocating the channel based on the channel related information included in the resource allocation response frame.

The channel related information may include at least one among operating channel information, primary channel information, and center frequency information of the first access point determined by the second access point.

The method of reallocating the channel may further include, receiving a resource allocation response frame including reallocated channel related information based on the interference information with respect to the adjacent BSS from the second access point, and reallocating the channel based on the channel related information included in the resource allocation response frame.

In still other example embodiments, a method of reallocating a channel performed at a first access point, the method of reallocating the channel includes, requesting interference measurement with respect to an adjacent BSS to at least one terminal connected to the first access point, receiving the interference information with respect to the adjacent BSS measured from the at least one terminal, and transmitting an inter BSS measurement response frame including the interference information with respect to the measured adjacent BSS to the second access point.

The interference information with respect to the adjacent BSS may include at least one among the interference information with respect to the arbitrary access point establishing the adjacent BSS and interference information with respect to at least one terminal included in the adjacent BSS.

The interference information with respect to the adjacent BSS may include at least one among an average received channel power indicator (RCPI) and an average receive signal to noise indicator (RSNI) with respect to the adjacent BSS.

The interference information with respect to the adjacent BSS may include at least one among an RCPI with respect to the adjacent BSS which is more than a predetermined RCPI level and an RSNI with respect to the adjacent BSS which is more than a predetermined RSNI.

The method of reallocating the channel may further include, transmitting a resource allocation request frame requesting channel reallocation to the second access point, receiving a resource allocation response frame including reallocated channel related information based on the interference information with respect to the adjacent BSS from the second access point, and reallocating the channel based on the channel related information included in the resource allocation response frame.

The channel related information may include at least one among operating channel information, primary channel information, and center frequency information of the first access point determined by the second access point.

The method of reallocating the channel may further include, receiving a resource allocation response frame including reallocated channel related information based on the interference information with respect to the adjacent BSS from the second access point, and reallocating the channel based on the channel related information included in the resource allocation response frame.

BRIEF DESCRIPTION OF DRAWINGS

Example embodiments of the inventive concept will become more apparent by describing in detail example embodiments of the inventive concept with reference to the accompanying drawings, in which:

FIG. 3 is a schematic diagram for describing a method of allocating channels to a plurality of access points, respectively, according to one embodiment of the inventive concept;

FIG. 4 is a schematic diagram for describing a method of allocating channels to a plurality of access points, respectively, according to another embodiment of the inventive concept;

DESCRIPTION OF EXAMPLE EMBODIMENTS

Figure 1:
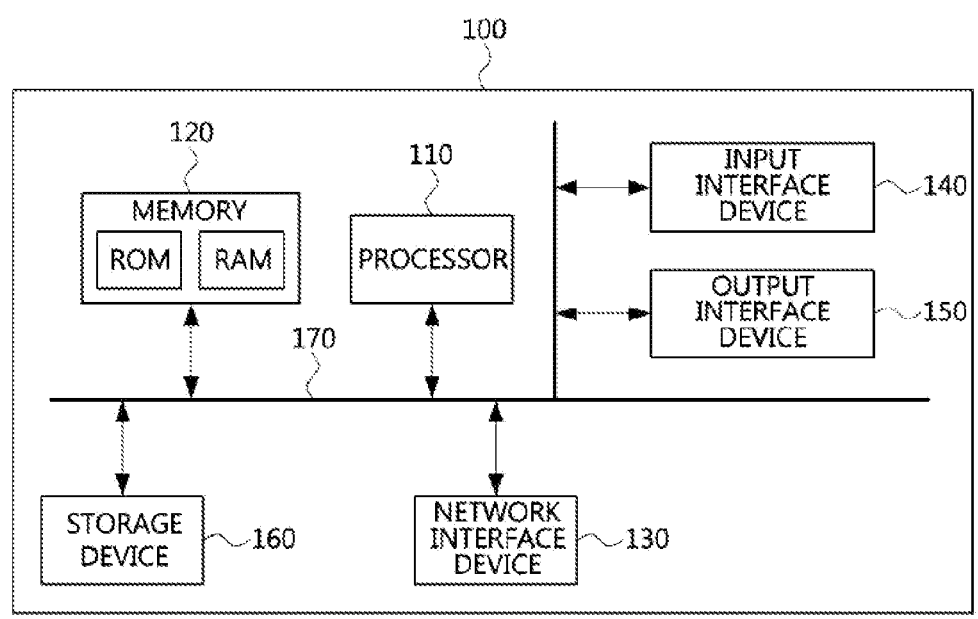
FIG. 1 is a block diagram illustrating a construction of a station performing methods according to an embodiment of the inventive concept.

While the invention is susceptible to various modifications and alternative forms, specific embodiments thereof are shown by way of examples in the drawings and will herein be described in detail.

It should be understood, however, that there is no intent to limit the invention to the particular forms disclosed, but on the contrary, the invention is to cover all modifications, equivalents, and alternatives falling within the spirit and scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the inventive concept will be described in detail with reference to the accompanying drawings. In order to facilitate a throughout understanding in the following description, like numbers refer to like elements in the drawings, and duplicated descriptions will be omitted with respect to the like elements.

Throughout the specification, a station (STA) may mean an arbitrary function medium including a medium access control (MAC) which follows regulations of an institute of electrical and electronics engineers (IEEE) 802.11 standard and an interface which is a physical layer with respect to a wireless medium. The station may be classified as a station (STA) which is an access point (AP) and a station (STA) which is a non-access point (non-AP). The station (STA) which is the access point (AP) may be simply referred to as an access point (AP), and the station (STA) which is the non-access point (non-AP) may be simply referred to as a terminal.

The station (STA) may include a processor and a transceiver, and may further include a user interface and a display device, etc. The processor may mean a unit designed to generate a frame to be transmitted through a wireless network or process a frame received through the wireless network, and may perform various functions for controlling the station (STA). The transceiver may be functionally connected with a processor, and mean a unit designed in order to transmit and receive a frame through the wireless network for the station (STA).

The AP may be referred to as an intensive controller, a base station (BS), a radio access station, a node B, an evolved node B, a relay, a mobile multihop relay-BS, a base transceiver system, or a site controller, etc., and may include a part or all of functions of them.

The terminal (that is, the non-AP) may be referred to as a wireless transmitting/receiving unit (WTRU), user equipment (UE), a user terminal (UT), an access terminal (AT), a mobile station (MS), a mobile terminal, a subscriber unit, a subscriber station (SS), a wireless device, or a mobile subscriber unit, etc., and may include a part or all of functions of them.

Here, the terminal may be a desktop computer, a laptop computer, a tablet PC, a wireless phone, a mobile phone, a smart phone, a smart watch, a smart glass, an e-book reader, a portable multimedia player (PMP), a portable game player, a navigation device, a digital camera, a digital multimedia broadcasting (DMB) player, a digital audio recorder, a digital audio player, a digital picture recorder, a digital picture player, a digital video recorder, a digital video player, etc. which can perform communication.

FIG. 1 is a block diagram illustrating a construction of a station performing methods according to an embodiment of the inventive concept.

Referring to FIG. 1, a station 100 may include at least one processor 110, a memory 120, and a network interface device 130 which is connected to a network and performs communication. Further, the station 100 may further include an input interface device 140, an output interface device 150, and a storage device 160, etc. Each component included in the station 100 may be connected through a bus 170, and mutually perform communication.

The processor 110 may execute a program command stored in the memory 120 and/or the storage device 160. The processor 110 may mean a central processing unit (CPU), a graphic processing unit (GPU), or an exclusive processor in which methods according to the inventive concept are performed. The memory 120 and the storage device 160 may be configured as a volatile storage medium and/or a non-volatile storage medium. For example, the memory 120 may be configured as a read only memory (ROM) and/or a random access memory (RAM).

Exemplary embodiments of the inventive concept may be applied to a WLAN system according to an IEEE 802.11 standard, and may also be applied to another communication system as well as the WLAN system according to the IEEE 802.11 standard.

For example, exemplary embodiments of the inventive concept may be applied to a portable Internet such as a wireless personal area network (WPAN), a wireless body area network (WBAN), a wireless broadband Internet (Wi-Bro), or world interoperability for microwave access (Wi-Max), a second generation (2G) mobile communication network such as global system for mobile communications (GSM) or code division multiple access (CDMA), a third generation (3G) mobile communication network such as wideband code division multiple access (WCDMA) or CDMA2000, a 3.5 generation (3.5G) mobile communication network such as high speed downlink packet access (HSDPA) or high speed uplink packet access (HSUPA), a fourth generation (4G) mobile communication network such as long term evolution (LTE) or LTE-Advanced, and a fifth generation (5G) mobile communication network, etc.

Figure 2:
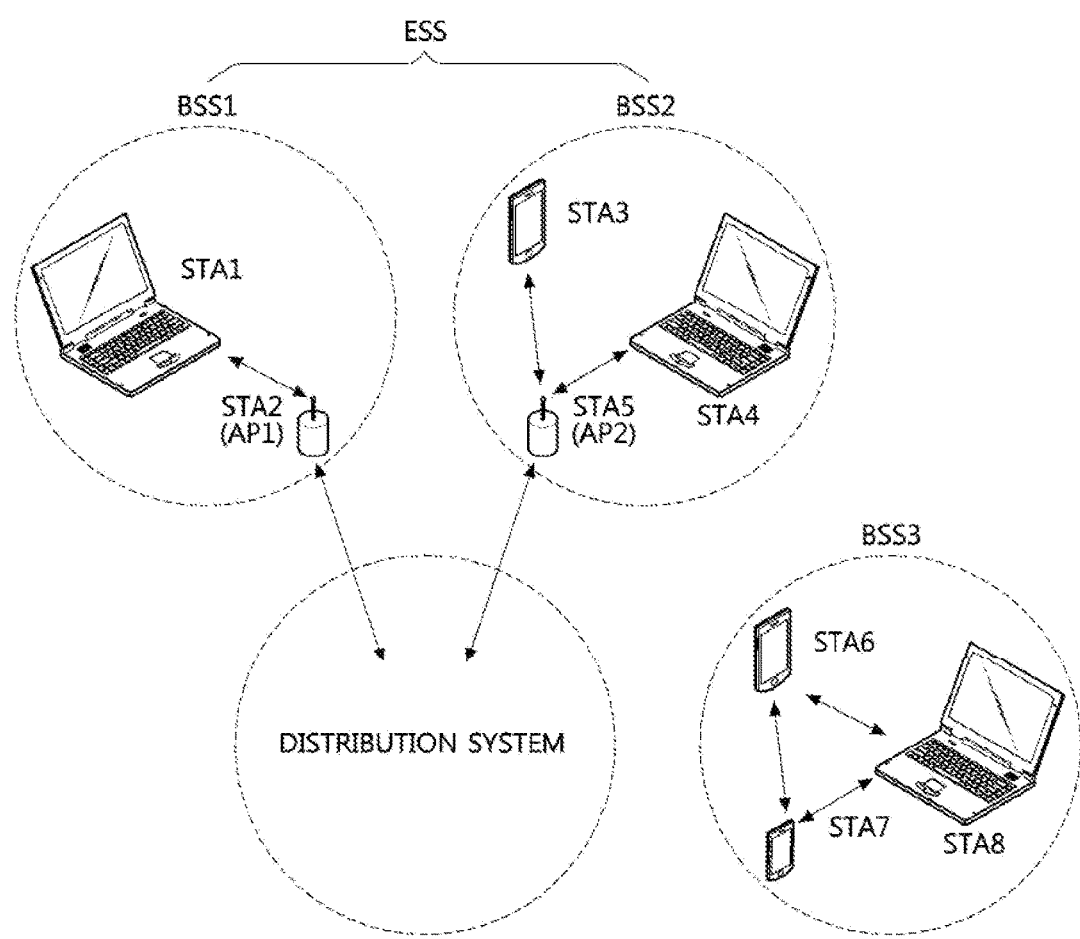
FIG. 2 is a conceptual diagram illustrating a construction of a wireless local area network system according to an IEEE 802.11 according to an embodiment of the inventive concept.

FIG. 2 is a schematic diagram illustrating a construction of a wireless local area network system according to an IEEE 802.11 according to an embodiment of the inventive concept.

Referring to FIG. 2, a WLAN system according to an IEEE 802.11 may include at least one basic service set (BSS). The BSS may mean a set of stations STA1, STA2 (AP1), STA3, STA4, STA5 (AP2), STA6, STA7, and STA8 capable of communicating with each other by performing successful synchronization, and may not mean a specific area.

The BSS may be classified as an infrastructure BSS and an independent BSS (IBSS). Here, the BSS1 and BSS2 may be the infrastructure BSSs, and the BSS3 may be the IBSS.

The BSS1 may include a first terminal STA1, a first access point STA2 (AP1) providing a distribution service, and a distribution system DS connecting a plurality of access points STA2 (AP1) and STA5 (AP2). In the BSS1, the first access point STA2 (AP1) may manage the first terminal STA1.

The BSS2 may include a third terminal STA3, a fourth terminal STA4, a second access point STA5 (AP2) providing a distribution service, and a distribution system connecting a plurality of access points STA2 (AP1) and STA5 (AP2). In the BSS2, the second access point STA5 (AP2) may manage the third terminal STA3 and the fourth terminal STA4.

The BSS3 may mean the IBSS operating as an ad-hoc mode. There is no access point which is a centralized management entity in the BSS3. That is, in the BSS3, the terminals STA6, STA7, and STA8 may be managed in a distributed manner. In the BSS3, every terminal STA6, STA7, and STA8 may mean a mobile terminal, and since the terminals STA6, STA7, and STA8 are not allowed to connect to the distribution system DS, a self-contained network may be constructed.

The access points STA2 (AP1) and STA5 (AP2) may provide connection to the distribution system DS through a wireless medium for the terminals STA1, and STA3 and STA4, respectively, connected to the access points themselves. Communication between the terminals STA1, STA3, and STA4 in the BSS1 or BSS2 may be generally performed through the access points STA2 (AP1) and STA5 (AP2), but direct communication may be performed between the terminals STA1, STA3, and STA4 when a direct link is set.

A plurality of infrastructure BSSs may be connected to each other through the distribution system DS. The plurality of BSSs connected through the distribution system DS may be referred to as an extended service set (ESS). The terminals STA1, STA2 (AP1), STA3, STA4, and STA5 (AP2) included in the ESS may communicate with each other, and may move from one BSS to another BSS while arbitrary terminals STA1, STA3, and STA4 seamlessly communicate in the same ESS.

The distribution system DS may be a mechanism for communicating one access point with another access point, and the access point may transmit a frame for terminals connected in the BSS in which it manages, or transmit a frame for an arbitrary terminal moved to another BSS. Further, the access point may transmit and receive a frame with an external network such as a wired network, etc. The distribution system DS may not be necessarily a network, and there is no limit to the construction of the distribution system DS when providing a predetermined distribution service prescribed in the IEEE 802.11 standard. For example, the distribution system DS may be a wireless network such as a mesh network, or be a physical structure to connect the access points each other.

As use of the WLAN is rapidly increased, a problem due to an overlapping BSS (OBSS) is being serious. Specifically, as the number of access points (for example, an access point according to an IEEE 802.11n or IEEE 802.11ac standard) performing wideband transmission using a multi-channel is rapidly increased, it may be realistically difficult to allocate a channel which is not overlapped between access points. In an area in which the access points are dense, performance of the WLAN may deteriorate due to collision between the BSSs by the overlap of the BSSs, channel access competition between the stations, etc.

The collision may be generated more frequently between the BSSs using the same channel, and different channels may be allocated to adjacent BSSs in order to prevent the collision. When the different channels are allocated to the adjacent BSSs, the collision between the adjacent BSSs may not be generated, and the adjacent BSSs may independently transmit and receive. For this, when establishing a new BSS, the access point has to set its own channel in order not to overlap a channel of the adjacent BSSs. Further, when interference is generated by the new BSS established by an adjacent access point, the access point may have to change its own channel according to necessity.

The number of channels which can be used in the WLAN is limited, but the number of the access points is rapidly being increased. Accordingly, it may not be easy to allocate a channel so that the adjacent access points use the channel which is not overlap each other. Actually, the channel may be overlapped between the adjacent access points, and in this case, performance of the WLAN may be improved or deteriorated according to a method of allocating the channel to the adjacent access points. Moreover, when the interference is generated by the new BSS established by the adjacent access point, transmission efficiency may be prevented from being lowered only when the access point changes its own channel.

Hereinafter, a method of allocating a channel in order to minimize collision between adjacent access points in an OBSS will be described in detail.

When there are a plurality of access points and the number of channels in which each of the plurality of access points can use is limited, it may be inevitable to allocate a portion of channels to be overlapped. In this case, performance of the WLAN can be improved according to a method of allocating a channel to each of the plurality of access points, a method of selecting a primary channel, etc.

FIG. 3 is a schematic diagram for describing a method of allocating channels to a plurality of access points, respectively, according to one embodiment of the inventive concept.

Referring to FIG. 3, a first access point AP1 may establish a BSS1, and the second access point AP2 may establish a BSS2. A band of 80 MHz may be allocated to the first access point AP1. That is, the first access point AP1 may operate at a primary channel 311 of a BW of 20 MHz, a first secondary channel 312 of a BW of 20 MHz, and a second secondary channel 313 of a BW of 40 MHz. The second access point AP2 may operate at a first secondary channel 321 of a BW of 20 MHz, a primary channel 322 of a BW of 20 MHz, and a second secondary channel 323 of a BW of 40 MHz.

Here, transmission and reception of the second access point AP2 through the first secondary channel 321 may be blocked by the primary channel 311 of the first access point AP1. Transmission and reception of the first access point AP1 through the first secondary channel 312 may be blocked by the primary channel 322 of the second access point AP2. In this case, the first access point AP1 may use the primary channel 311, but may not use the second secondary channel 313. Further, the second access point AP2 may use the primary channel 322, but may not use the second secondary channel 323.

FIG. 4 is a schematic diagram for describing a method of allocating channels to a plurality of access points, respectively, according to another embodiment of the inventive concept.

Referring to FIG. 4, a first access point AP1 may establish a BSS1, and a second access point may establish a BSS2. A band of 80 MHz may be allocated to the first access point AP1. That is, the first access point AP1 may operate at a first secondary channel 411 of a BW of 20 MHz, a second secondary channel 412 of a BW of 20 MHz, a third secondary channel 413 of a BW of 20 MHz, and a primary channel 414 of a BW of 20 MHz. A band of 80 MHz in which a portion overlaps the first access point AP1 may be allocated to the second access point AP2. That is, the second access point AP2 may operate at a primary channel 421 of a BW of 20 MHz, a first secondary channel 422 of a BW of 20 MHz, a second secondary channel 423 of a BW of 20 MHz, and a third secondary channel 424 of a BW of 20 MHz.

Here, since the primary channel 414 of the first access point AP1 does not overlap the channels 421, 422, 423, and 424 of the second access point AP2, transmission and reception of the second access point AP2 may not be blocked by the primary channel 414 of the first access point AP1. Since the primary channel 421 of the second access point AP2 does not overlap the channels 411, 412, 413, and 414 of the first access point AP1, transmission and reception of the first access point AP1 may not be blocked by the primary channel 421 of the second access point AP2. Accordingly, the access points AP1 and AP2 can perform the transmission through a broadband.

Meanwhile, each of the access points AP1 and AP2 may perform simultaneous transmission through a narrow band. For example, the transmission through the primary channel 414 and the first to third secondary channels 411, 412, and 413 of the first access point AP1 may be simultaneously performed together with the transmission through the primary channel 421 of the second access point AP2. The transmission through the primary channel 414 and the second and third secondary channels 412 and 413 of the first access point AP1 may be simultaneously performed together with the transmission through the primary channel 421 and the first secondary channel 422 of the second access point AP2.

Transmission through the primary channel 414 and the third secondary channel 413 of the first access point AP1 may be simultaneously performed together with the transmission through the primary channel 421 and the first and second secondary channels 422 and 423 of the second access point AP2. Transmission through the primary channel 414 of the first access point AP1 may be simultaneously performed together with the transmission through the primary channel 421 and the first to third secondary channels 422, 423, and 424 of the second access point AP2.

Meanwhile, when establishing the new BSS, the access point may establish its own BSS by selecting a channel in which the access point does not use through a scanning operation. When the access point has to use a channel overlapping an adjacent access point, the access point may select a channel advantageous to broadband transmission, simultaneous transmission, etc. based on a channel occupation status of the adjacent access point. In this case, the access point may not consider a channel in which a hidden access point uses. When the new BSS is established by the access point, a terminal included in the newly established BSS may receive interference by the BSS established by the hidden access point. Accordingly, when establishing the new BSS, it may be necessary for the access point to consider the channel used by the hidden access point.

Figure 5:
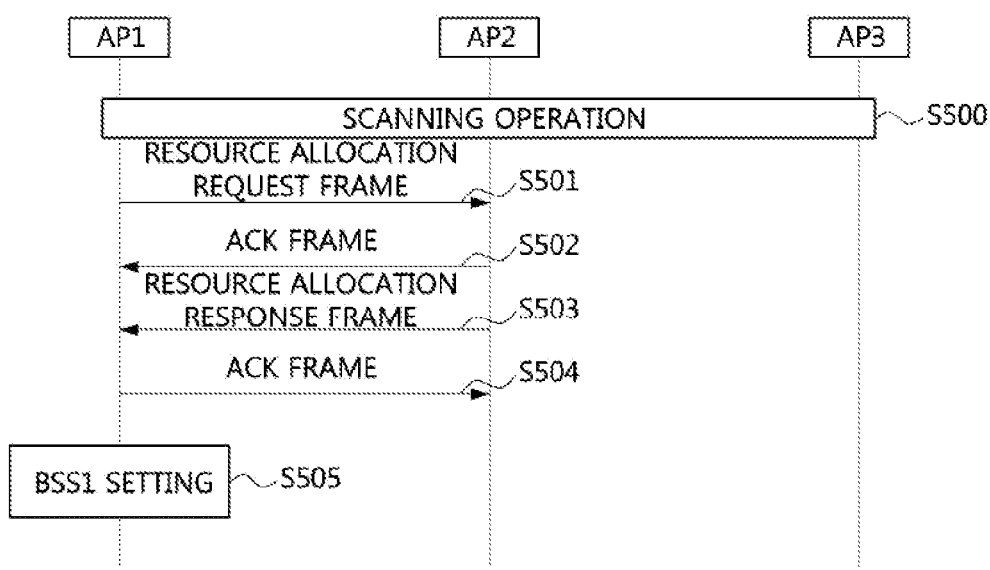
FIG. 5 is a diagram for describing a method of allocating a channel according to an embodiment of the inventive concept.

FIG. 5 is a diagram for describing a method of allocating a channel according to an embodiment of the inventive concept.

Referring to FIG. 5, the first access point AP1 may mean an access point which wants to establish a new BSS1. The second access point AP2 may establish a BSS2, and operate as a master access point M-AP. The third access point AP3 may establish a BSS3, and mean an access point adjacent to the first access point AP1.

The first access point AP1 may perform a scanning operation for finding the master access point M-AP and an adjacent access point (S500). At this time, the first access point AP1 may perform an active scanning operation or a passive scanning operation.

Active Scanning Operation

The first access point AP1 may transmit a probe request frame in a broadcast manner. The second access point AP2 operating as the master access point M-AP may receive the probe request frame from the first access point AP1, and transmit a probe response frame which is a response to the probe request frame to the first access point AP1.

Here, the probe response frame may include M-AP enable information. The M-AP enable information may indicate whether the second access point AP2 transmitting a corresponding probe response frame operates as the master access point M-AP. For example, when the M-AP enable information is set as 0 which is a binary number, this may indicate that the second access point AP2 transmitting the corresponding probe response frame does not operate as the master access point M-AP. When the M-AP enable information is set as 1 which is a binary number, this may indicate that the second access point AP2 transmitting the corresponding probe response frame operates as the master access point M-AP. Here, the M-AP enable information may be expressed using 1 bit of extended capabilities element.

Accordingly, the probe response frame may include M-AP enable information indicating that the second access point AP2 operates as the master access point M-AP. Further, the probe response frame may further include an identifier (for example, a basic service set identifier (BSSID), etc.), operating channel information (that is, a channel number, a channel bandwidth, etc.), primary channel information (that is, a channel number, a channel bandwidth, etc.), etc. of the second access point AP2.

Further, the probe response frame may further include information of an access point adjacent to the second access point AP2. The information of the adjacent access point included in the probe response frame is as follows.

Figure 6:
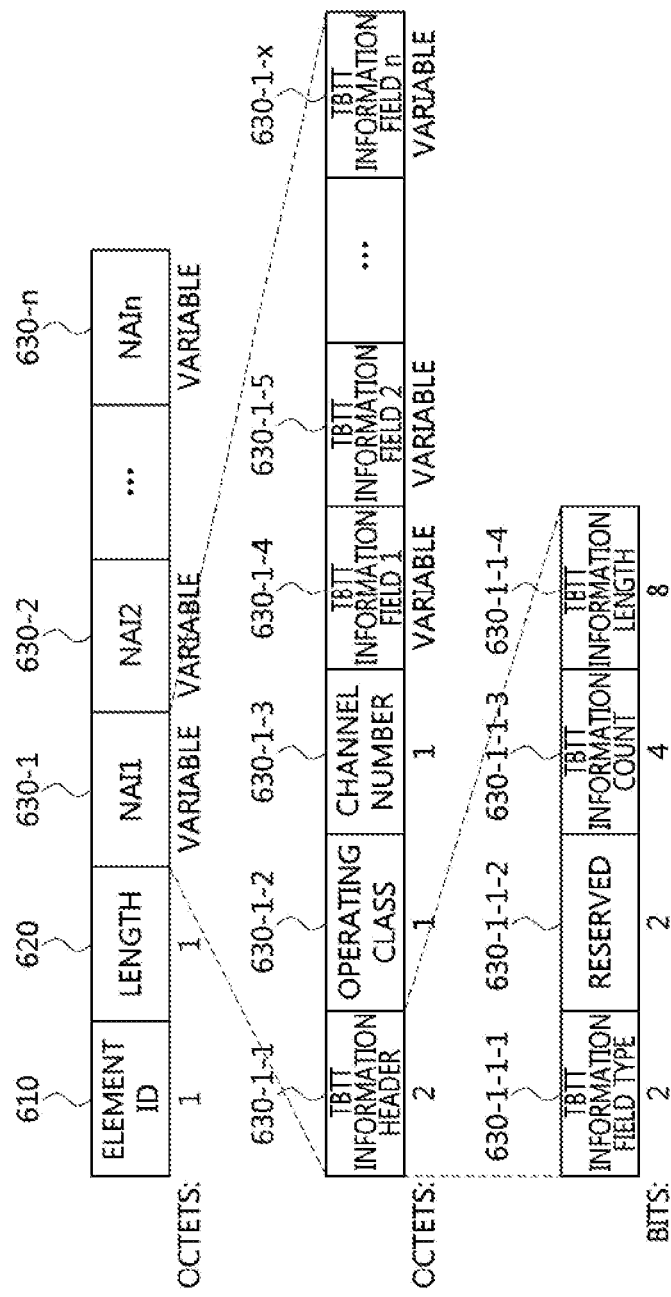
FIG. 6 is a diagram illustrating information of an adjacent access point according to an embodiment of the inventive concept.

FIG. 6 is a diagram illustrating information of an adjacent access point according to an embodiment of the inventive concept.

Referring to FIG. 6, information on an adjacent access point may include an element ID field 610, a length field 620, one or more neighbor AP information (NAI) fields 630-1, 630-2, . . . , 630-n, etc. The NAI1 field 630-1 may include information of a first adjacent access point, the NAI2 630-2 may include information on a second adjacent access point, and the NAIn field 630-n may include information on an n-th adjacent access point. Here, n is a natural number.

The NAI1 field 630-1 may include a target beacon transmission time (TBTT) information header field 630-1-1, an operating class field 630-1-2, a channel number field 630-1-3, and one or more TBTT information field 630-1-4, 630-1-5, . . . , 630-1-n.

The operating class field 630-1-2 may indicate a band, and a bandwidth of the primary channel, etc. of the first adjacent access point. The channel number field 630-1-3 may indicate a primary channel number of the first adjacent access point. The one or more TBTT information fields 630-1-4, 630-1-5, . . . , 630-1-n may include a TBTT offset field and a BSSID field. Here, x is a natural number.

The TBTT information header field 630-1-1 may include a TBTT information field type field 630-1-1-1, a reserved field 630-1-1-2, a TBTT information count field 630-1-1-3, and a TBTT information length field 630-1-1-4. Here, one bit of the reserved field 630-1-1-2 may indicate whether the first adjacent access point is under channel coordination of the master access point M-AP.

For example, when one bit of the reserved field 630-1-1-2 is set as 0 which is a binary number, this may indicate that the first adjacent access point is not under the channel coordination of the master access point M-AP. When one bit of the reserved field 630-1-1-2 is set as 1 which is a binary number, this may indicate that the first adjacent access point is under the channel coordination of the master access point M-AP.

Referring to FIG. 5 again, when the second access point AP2 and the third access point AP3 are adjacent to each other, the probe response frame may include information of the third access point AP3.

The first access point AP1 may receive the probe response frame which is the response of the probe request frame. The first access point AP1 may recognize that the second access point AP2 transmitting the corresponding probe response frame operates as the master access point M-AP based on the M-AP enable information included in the probe response frame. Further, the first access point AP1 may recognize the ID, the operating channel information, the primary channel information, etc. of the second access point AP2 based on the information included in the probe response frame. Moreover, the first access point AP1 may recognize information (that is, the operating channel, the primary channel, whether there is under the channel coordination of the master access point M-AP, etc.) of the third access point AP3 adjacent to the second access point AP2 based on the information included in the probe response frame.

Meanwhile, the third access point AP3 may receive the probe request frame from the first access point AP1, and transmit the probe response frame which is the response with response to the probe request frame to the first access point AP1. Here, the probe response frame may include the M-AP enable information indicating that the third access point AP3 does not operate as the master access point M-AP. Further, the probe response frame may include the operating channel information, the primary channel information, whether there is under the channel coordination of the master access point M-AP, the ID of the master access point M-AP performing the channel coordination, etc. of the third access point AP3.

The first access point AP1 may receive the probe response frame which is the response with respect to the probe request frame from the third access point AP3. The first access point AP1 may recognize that the third access point AP3 does not operate as the master access point M-AP based on the M-AP enable information included in the probe response frame. Further, the first access point AP1 may recognize the ID, the operating channel information, the primary channel information, whether there is under the channel coordination of the master access point M-AP, the ID of the master access point M-AP performing the channel coordination, etc. of the third access point AP3 based on the information included in the probe response frame.

Passive Scanning Operation

The second access point AP2 may periodically transmit a beacon frame in a broadcast manner. The beacon frame may include the M-AP enable information indicating that the second access point AP2 operates as the master access point M-AP. Further, the beacon frame may further include the ID, the operating channel information, the primary channel information, etc. of the second access point AP2. Moreover, the beacon frame may further include the information (that is, the information of the adjacent access point described with reference to FIG. 6) of an access point adjacent to the second access point AP2.

The first access point AP1 may receive the beacon frame from the second access point AP2. The first access point AP1 may recognize that the second access point AP2 transmitting the corresponding beacon frame operates as the master access point M-AP based on the M-AP enable information included in the beacon frame. Further, the first access point AP1 may recognize the ID, the operating channel information, the primary channel information, etc. of the second access point AP2 based on the information included in the beacon frame. Moreover, the first access point AP1 may recognize the information (that is, the operating channel, the primary channel, whether there is under the channel coordination of the master access point M-AP, etc.) of the access point adjacent to the second access point AP2 based on the information included in the beacon frame.

Meanwhile, the third access point AP3 may periodically transmit the beacon frame in the broadcast manner. The beacon frame may include the M-AP enable information indicating that the third access point AP3 does not operate as the master access point M-AP. Further, the beacon frame may include the operating channel information, the primary channel information, whether there is under the channel coordination of the master access point M-AP, the ID of the master access point M-AP performing the channel coordination, etc. of the third access point AP3.

The first access point AP1 may receive the beacon frame from the third access point AP3. The first access point AP1 may recognize that the third access point AP3 does not operate as the master access point M-AP based on the M-AP enable information included in the beacon frame. Further, the first access point AP1 may recognize the ID, the operating channel information, the primary channel information, whether there is under the channel coordination of the master access point M-AP, the ID of the master access point M-AP performing the channel coordination, etc. of the third access point AP3 based on the information included in the beacon frame.

After this, the first access point AP1 may determine candidate channel information which the first access point AP1 wants based on the information (for example, the operating channel information, the primary channel information, etc.) of the adjacent access point obtained through the scanning operation, and generate a resource allocation request frame including the determined candidate channel information. A structure of the resource allocation request frame will be described below.

Figure 7:
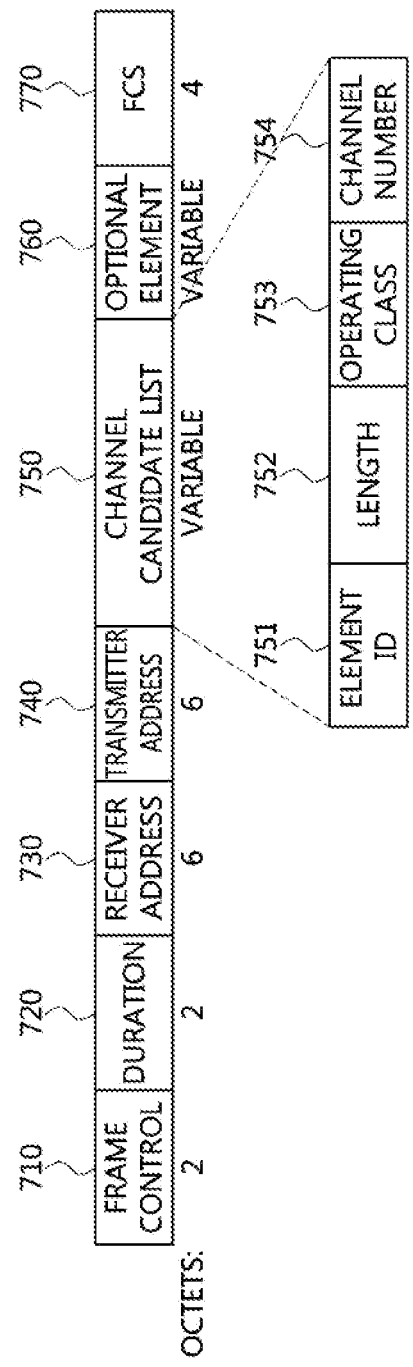
FIG. 7 is a diagram illustrating a structure of a resource allocation request frame according to an embodiment of the inventive concept.

FIG. 7 is a diagram illustrating a structure of a resource allocation request frame according to an embodiment of the inventive concept.

Referring to FIG. 7, a resource allocation request frame may include a frame control field 710, a duration field 720, a receiver address (RA) field 730, a transmitter address (TA) field 740, one or more channel candidate list field 750, an optional element field 760, and a frame check sequence field 770.

The channel candidate list field 750 may include candidate channel information which the first access point AP1 wants. Specifically, the channel candidate list field 750 may include an element ID field 751, a length field 752, an operating class field 753, and a channel number field 754. For example, the operating class field 753 may indicate a band, and a bandwidth of the primary channel, etc. of the first access point AP1. The channel number field 754 may indicate a number of the primary channel, etc. of the first access point AP1. Further, the channel candidate list field 750 may indicate the operating channel, the number of the primary channel, the bandwidth of the primary channel, a center frequency, etc. of the first access point AP1.

Meanwhile, the resource allocation request frame may further include a beacon candidate list field (not shown) as well as the channel candidate list field 750. The beacon candidate list field may indicate a beacon interval, a TBTT, etc. which the first access point AP1 wants. Here, the beacon candidate list field may be set in the optional element field 760.

Referring to FIG. 5 again, the first access point AP1 may transmit the resource allocation request frame to the second access point AP2 (S501). At this time, when the channel is in an idle status during a distributed coordination function inter frame space (DIFS), the first access point AP1 may transmit the resource allocation request frame to the second access point AP2 after a contention window according to random backoff.

When receiving the resource allocation request frame, the second access point AP2 may transmit an acknowledge (ACK) frame to the first access point AP1 after a short inter frame space from a reception end time point of the resource allocation request frame.

The second access point AP2 may determine the operating channel, the number of the primary channel, the bandwidth of the primary channel, the center frequency, etc. of the first access point AP1 by considering information in which the channel candidate list field indicates, a channel allocation status of each of access points which autonomously perform channel coordination, etc. included in the resource allocation request frame. At this time, the second access point AP2 may determine the operating channel, the number of the primary channel, the bandwidth of the primary channel, the center frequency, etc. of the first access point AP1 so that broadband transmission probability and simultaneous transmission probability through a narrow band in an overlapping channel are improved. Further, the second access point AP2 may determine the operating channel, the number of the primary channel, the bandwidth of the primary channel, the center frequency, etc. of the first access point AP1 in order not to overlap the operating channel of a legacy access point.

Meanwhile, the second access point AP2 may determine a beacon interval, a TBTT, etc. of the first access point AP1 based on information in which the beacon candidate list field included in the resource allocation request frame indicates. The second access point AP2 may generate a resource allocation response frame including at least one among the operating channel, the number of the primary channel, the bandwidth of the primary channel, the center frequency, the beacon interval, and the TBTT of the determined first access point AP1. A structure of the resource allocation response frame will be described below.

Figure 8:
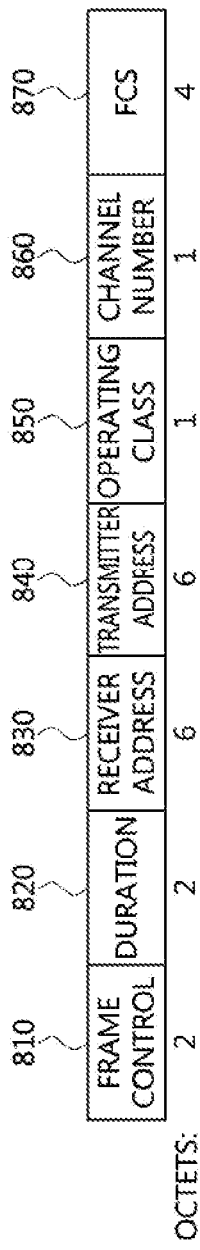
FIG. 8 is a diagram illustrating a structure of a resource allocation response frame according to an embodiment of the inventive concept.

FIG. 8 is a diagram illustrating a structure of a resource allocation response frame according to an embodiment of the inventive concept.

Referring to FIG. 8, a resource allocation response frame may include a frame control field 810, a duration field 820, a receiver address field 830, a transmitter address field 840, an operating class field 850, a channel number field 860, and a FCS field 870. The operating class field 850 may indicate the band, the bandwidth of the primary channel, etc. of the first access point AP1. The channel number field 860 may indicate the number of the primary channel, etc. of the first access point AP1. Further, the resource allocation response frame may further include information indicating the beacon interval, the TBTT, etc. of the first access point AP1.

Referring to FIG. 5 again, the second access point AP2 may transmit the resource allocation response frame to the first access point AP1 (S503). At this time, the second access point AP2 may transmit the resource allocation response frame to the first access point AP1 after the SIFS from the reception end time point of the ACK frame.

When receiving the resource allocation response frame from the second access point AP2, the first access point AP1 may transmit the ACK frame to the second access point AP2 after the SIFS from the reception end time point of the resource allocation response frame (S504). The first access point AP1 may recognize its own operating channel, the number of the primary channel, a bandwidth of the primary channel, a center frequency, a beacon interval, TBTT, etc. based on the information included in the resource allocation response frame, and establish the BSS1 based on them (S505).

After the BSS1 is established as described above, the first access point AP1 may change the channel of the BSS1 when interference from the adjacent BSS is increased due to the establishment of the new BSS, the channel change of the adjacent BSS, etc. Hereinafter, a method of measuring interference with respect to an adjacent BSS, and a method of changing a channel of a BSS based on measured interference will be described in detail.

Figure 9:
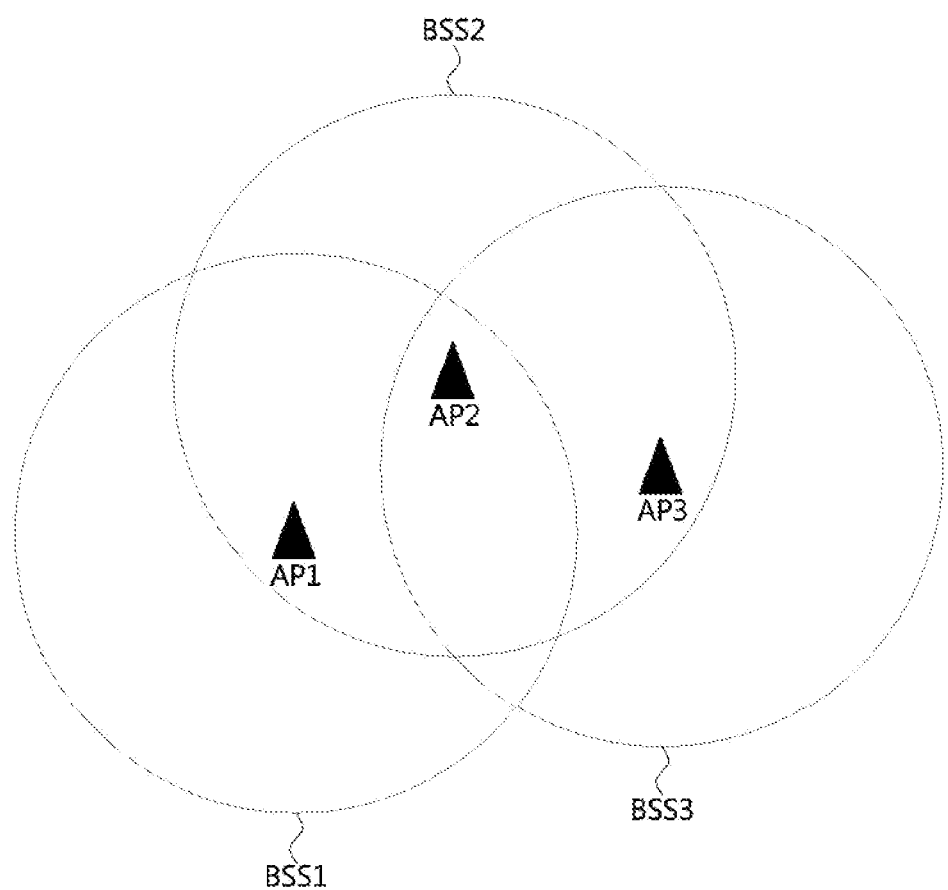
FIG. 9 is a schematic diagram illustrating an overlapping basic service set (OBSS) according to an embodiment of the inventive concept.
Figure 10:
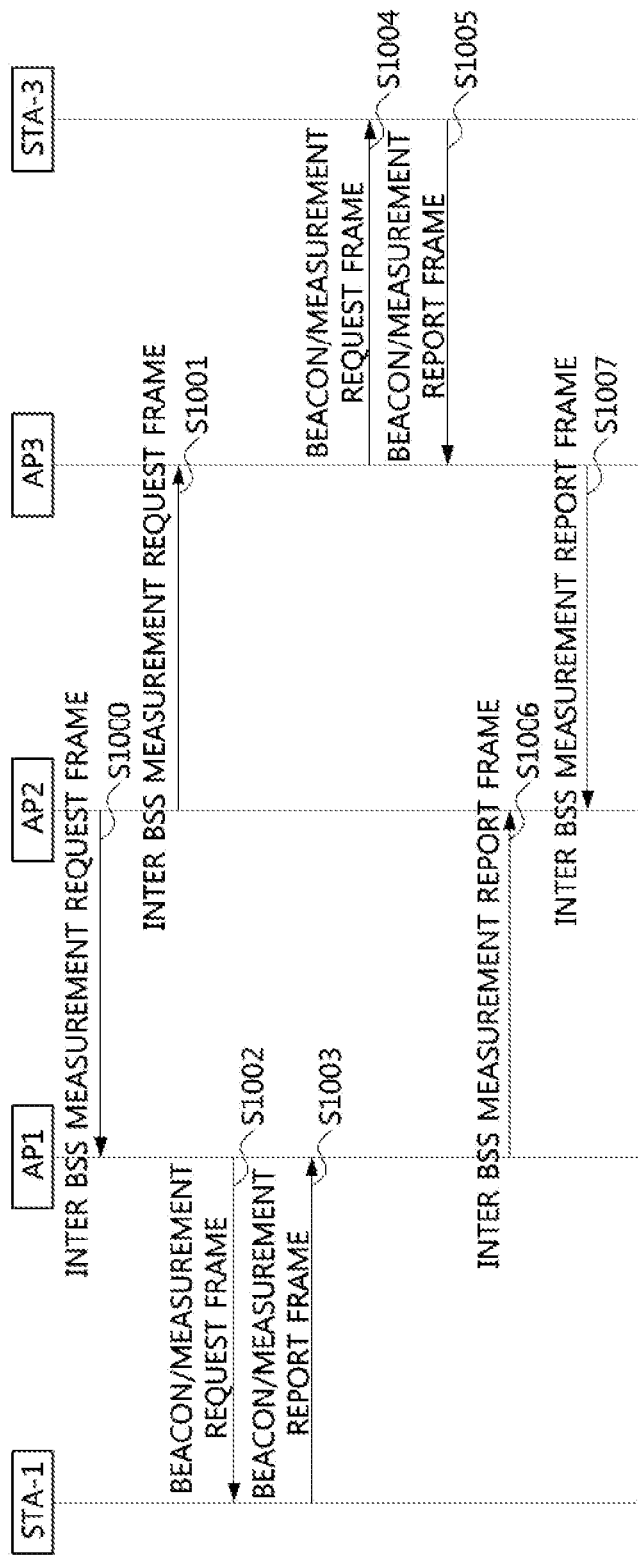
FIG. 10 is a diagram for describing a method of measuring inter BSS interference according to one embodiment of the inventive concept.

FIG. 9 is a conceptual diagram illustrating an overlapping basic service set (OBSS) according to an embodiment of the inventive concept, and FIG. 10 is a diagram for describing a method of measuring inter BSS interference according to one embodiment of the inventive concept.

Referring to FIGS. 9 and 10, the first access point AP1 may establish the BSS1. The second access point AP2 may establish the BSS2, and operate as a master access point M-AP. The second access point AP2 may perform the channel coordination with respect to the first access point AP1 and the third access point AP3. The third access point AP3 may establish the BSS3. The first access point AP1 and the third access point AP3 may be a hidden access point relationship. The first access point AP1 and the third access point AP3 may be located in the BSS2. That is, the second access point AP2 may communicate with the first access point AP1 and the third access point AP3.

The second access point AP2 may measure interference in the WLAN, and change a channel of the first access point AP1 and the second access point AP2 based on the measured result. First, the second access point AP2 may generate an inter BSS measurement request frame instructing interference measurement to the first access point AP1 and the third access point AP3. A structure of the inter BSS measurement request frame will be described below.

Figure 11:
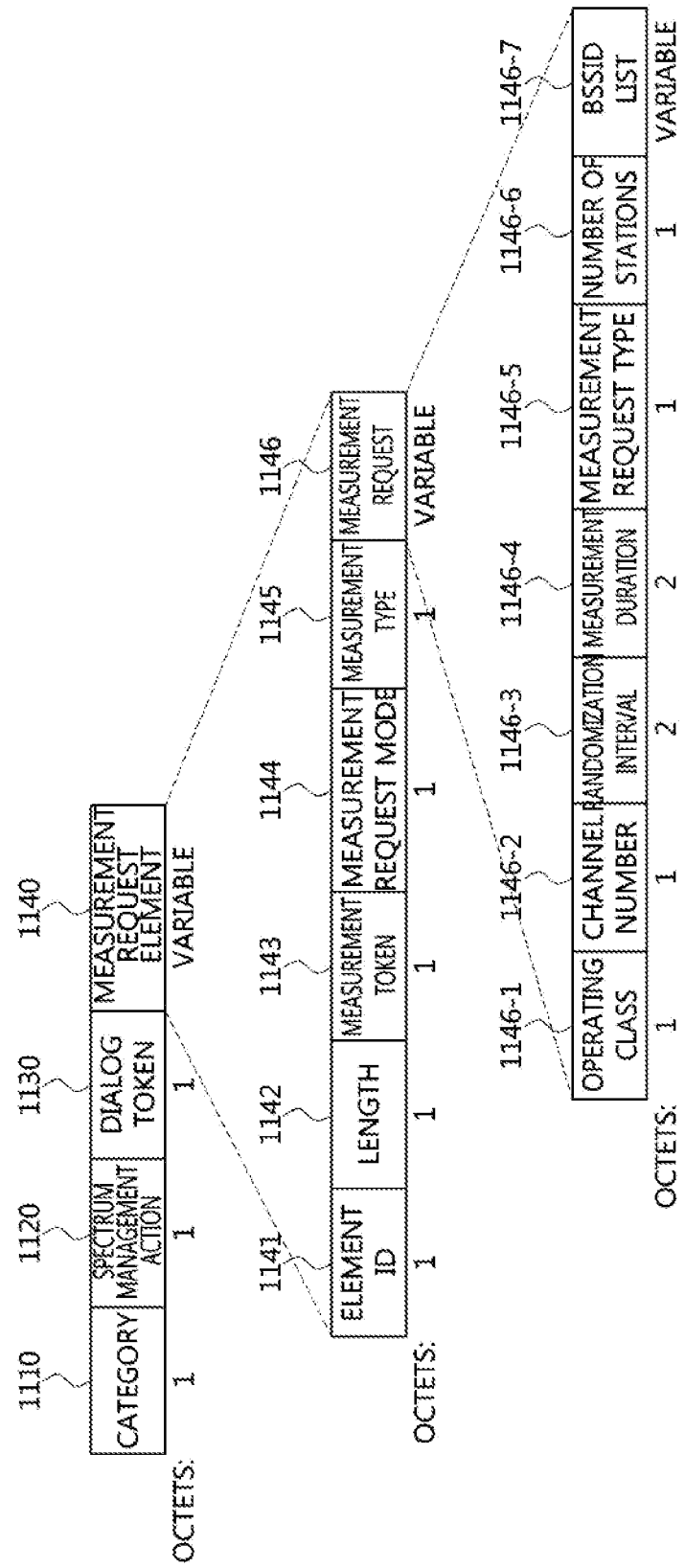
FIG. 11 is a diagram illustrating a structure of an inter BSS measurement request frame according to an embodiment of the inventive concept.

FIG. 11 is a diagram illustrating a structure of an inter BSS measurement request frame according to an embodiment of the inventive concept.

Referring to FIG. 11, an inter BSS measurement request frame may include a category field 1110, a spectrum management action field 1120, a dialog token field 1130, and a measurement request element field 1140. The measurement request element field 1140 may include an element ID field 1141, a length field 1142, a measurement token field 1143, a measurement request mode field 1144, a measurement type field 1145, and a measurement request field 1146.

The measurement request mode field 1144 may indicate whether a current frame is the inter BSS measurement request frame. For example, when an arbitrary one bit of the measurement request mode field 1144 is set as 0 which is a binary number, this may indicate that the current frame is not the inter BSS measurement request frame. When the arbitrary one bit of the measurement request mode field 1144 is set as 1 which is a binary number, this may indicate that the current frame is the inter BSS measurement request frame.

The measurement request field 1146 may include information with respect to at least one access point which is an interference measurement target. That is, the measurement request field 1146 may include an operating class field 1146-1, a channel number field 1146-2, a randomization interval field 1146-3, a measurement duration field 1146-4, a measurement request type field 1146-5, a station number field 1146-6, and a BSSID list field 1146-7.

The station number field 1146-6 may indicate the number of access points or the number of terminals which is the interference measurement target. The BSSID list field 1146-7 may include an ID (that is, BSSID) of an access point which is the interference measurement target, or an ID (that is, AID) of a terminal. The BSSID list field 1146-7 may indicate an address of a wildcard.

Referring to FIGS. 9 and 10 again, the second access point AP2 may transmit the inter BSS measurement request frame requesting interference measurement with respect to the BSS3 established by the third access point AP3 to the first access point AP1 (S1000). Further, the second access point AP2 may transmit the inter BSS measurement request frame requesting interference measurement with respect to the BSS1 established by the first access point AP1 to the third access point AP3 (S1001).

The first access point AP1 may receive the inter BSS measurement request frame, and recognize that the interference measurement with respect to the BSS3 is requested based on the information included in the inter BSS measurement request frame. In this case, the first access point AP1 may request the interference measurement with respect to the BSS3 to at least one terminal having an interference measurement function among the terminals connected to the first access point itself. The first access point AP1 may request the interference measurement with respect to the BSS3 using a beacon request frame or a measurement request frame.

Here, the beacon request frame may mean a frame requesting the interference measurement with respect to the third access point AP3. The measurement request frame may mean a frame requesting the interference measurement with respect to at least one terminal including in the third access point AP3 and the BSS3. A structure of the beacon request frame will be described below.

Figure 12:
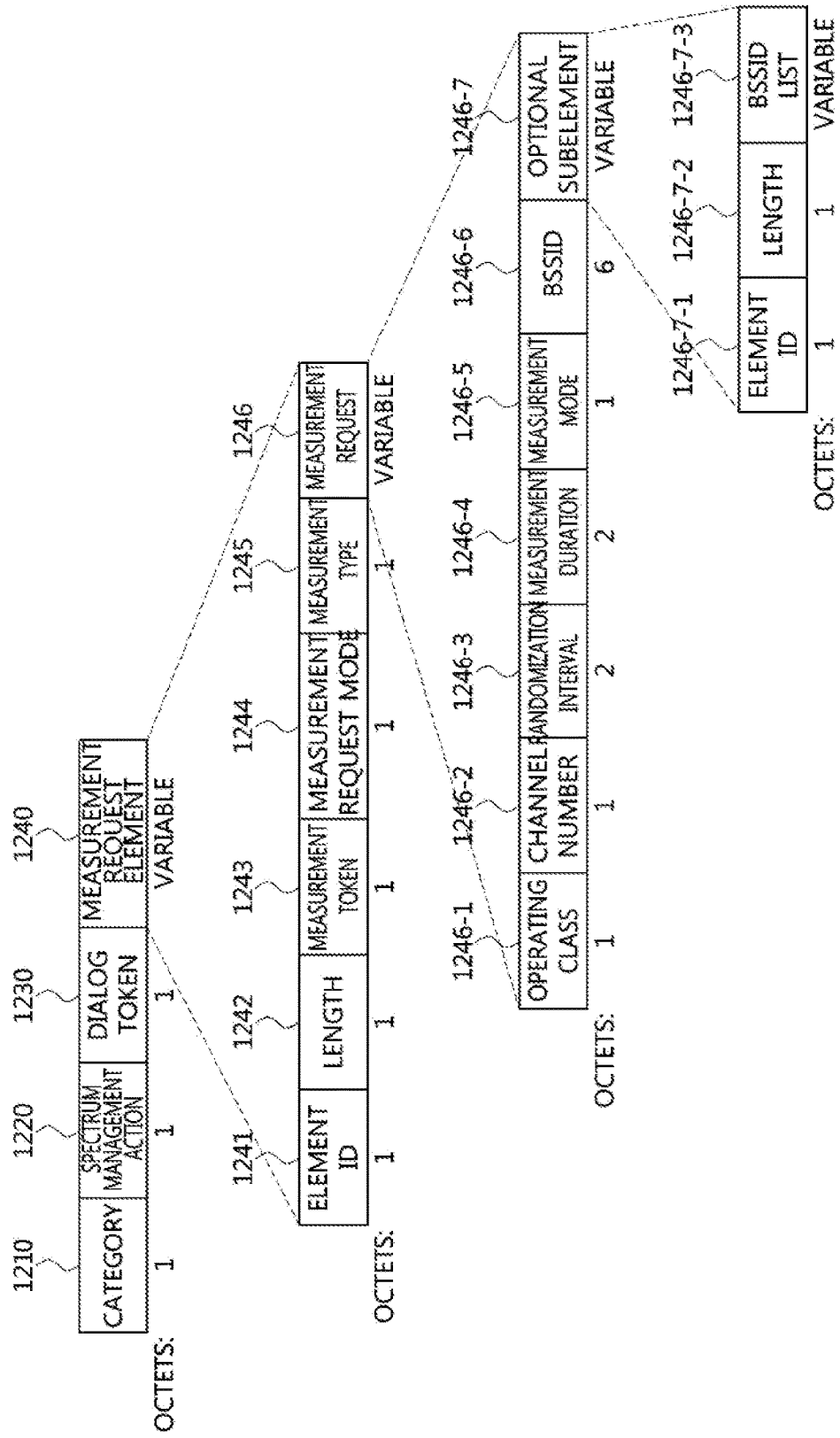
FIG. 12 is a diagram illustrating a structure of a beacon request frame according to an embodiment of the inventive concept.

FIG. 12 is a diagram illustrating a structure of a beacon request frame according to an embodiment of the inventive concept.

Referring to FIG. 12, a beacon request frame may include a category field 1210, a spectrum management action field 1220, a dialog token field 1230, and a measurement request element field 1240. The measurement request element field 1240 may include an element ID field 1241, a length field 1242, a measurement token field 1243, a measurement request mode field 1244, a measurement type field 1245, and a measurement request field 1246.

The measurement request field 1246 may include an operating class field 1246-1, a channel number field 1246-2, a randomization interval field 1246-3, a measurement duration field 1246-4, a measurement mode field 1246-5, a BSSID field 1246-6, and an optional subelement field 1246-7. The optional subelement field 1246-7 may include an element ID field 1246-7-1, a length field 1246-7-2, and a BSSID list field 1246-7-3.

When the BSSID field 1246-6 of the beacon request frame includes an ID of a specific access point and the BSSID list field 1246-7-3 does not include the BSSID list, this may mean that the interference measurement with respect to the specific access point specified by the BSSID field 1246-6 is requested. Further, when the BSSID field 1246-6 of the beacon request frame includes a wildcard address and the BSSID list field 1246-7-3 does not include the BSSID list, this may mean that the interference measurement with respect to every access point is requested. Moreover, when the BSSID field 1246-6 of the beacon request frame includes the wildcard address and the BSSID list field 1246-7-3 includes the BSSID list, this may mean that the interference measurement with respect to at least one access point specified by the BSSID list field 1246-7-3 is requested.

Meanwhile, a structure of the measurement request frame will described below.

Figure 13:
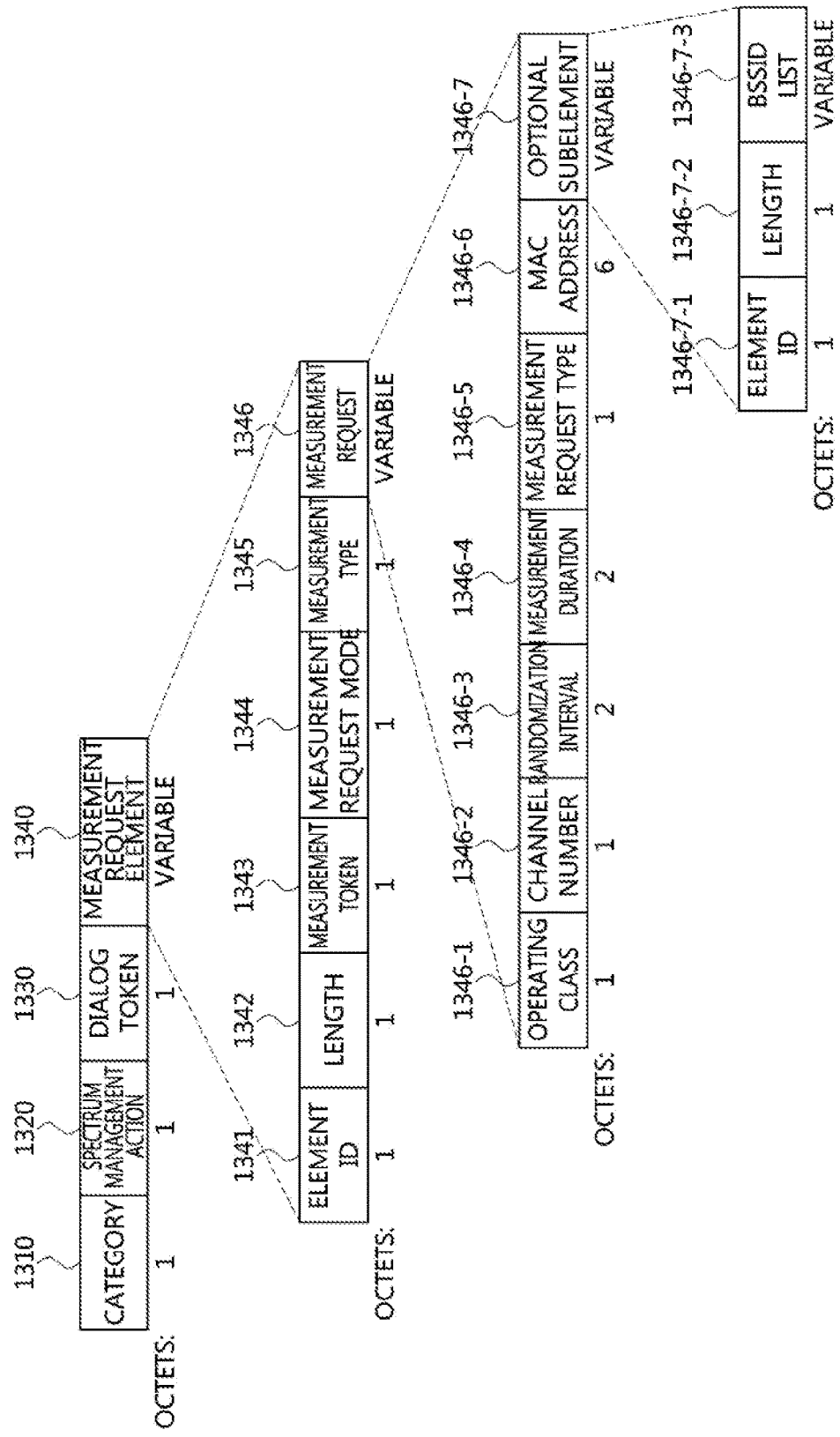
FIG. 13 is a diagram illustrating a structure of a measurement request frame according to an embodiment of the inventive concept.

FIG. 13 is a diagram illustrating a structure of a measurement request frame according to an embodiment of the inventive concept.

Referring to FIG. 13, a measurement request frame may include a category field 1310, a spectrum management action field 1320, a dialog token field 1330, and a measurement request element field 1340. The measurement request element field 1340 may include an element ID field 1341, a length field 1342, a measurement token field 1343, a measurement request mode field 1344, a measurement type field 1345, and a measurement request field 1346.

The measurement request field 1346 may include an operating class field 1346-1, a channel number field 1346-2, a randomization interval field 1346-3, a measurement duration field 1346-4, a measurement request type field 1346-5, a MAC address field 1346-6, and an optional subelement field 1346-7. The optional subelement field 1346-7 may include an element ID field 1346-7-1, a length field 1346-7-2, and a BSSID list field 1347-7-3.

When the MAC address field 1346-6 of the measurement request frame includes an address of a specific terminal and the BSSID list field 1346-7-3 does not include the BSSID list, this may mean that the interference measurement with respect to the specific terminal specified by the MAC address field 1346-6 is requested. Further, when the MAC address field 1346-6 of the measurement request frame includes a wildcard address and the BSSID list field 1346-7-3 does not include the BSSID list, this may mean that the interference measurement with respect to every terminal is requested. Moreover, when the MAC address field 1346-6 of the measurement request field 1346-7-3 includes the wildcard address and the BSSID list field 1346-7-3 includes the BSSID list, this may mean that the interference measurement with respect to at least one access point specified by the BSSID list field 1346-7-3 and the terminal connected to a corresponding access point is requested.

Referring to FIGS. 9 and 10 again, the first access point AP1 may request the interference measurement with respect to the third access point AP3 by transmitting the beacon request frame to at least one terminal STA-1 connected to the first access point itself (S1002). Here, the BSSID field 1246-6 of the beacon request frame may indicate an ID of the third access point AP3. Further, the BSSID field 1246-6 of the beacon request frame may indicate a wildcard address, and the BSSID list field 1246-7-3 may include the BSSID list consisted of the ID of the third access point AP3.

The first access point AP1 may request the interference measurement with respect to the third access point AP3 and the terminal STA-3 connected to the third access point AP3 by transmitting the measurement request frame instead of the beacon request frame to at least one terminal STA-1 connected to the first access point itself (S1002). Here, the MAC address field 1346-6 of the measurement request frame may represent the wildcard address, and the BSSID list field 1346-7-3 may include the BSSID list consisted of the ID of the third access point AP3.

The terminal STA-1 may receive the beacon request frame or the measurement request frame. When receiving the beacon request frame, the terminal STA-1 may recognize that the interference measurement with respect to the third access point AP3 is requested based on the information included in the received beacon request frame. The terminal STA-1 may perform interference measurement on the third access point AP3. For example, the terminal STA-1 may receive an arbitrary frame from the third access point AP3, and acquire a received channel power indicator (RCPI), a received signal to noise indicator (RSNI), etc. from the received arbitrary frame.

When receiving the measurement request frame, the terminal STA-1 may recognize that the interference measurement with respect to the third access point AP3 and the terminal STA-3 connected to the third access point AP3 is requested based on the information included in the received measurement request frame. The terminal STA-1 may perform the interference measurement on the third access point AP3 and the terminal STA-3 connected to the third access point AP3. For example, the terminal STA-1 may receive an arbitrary frame from the third access point AP3, and acquire the RCPI, the RSNI, etc. from the received arbitrary frame. Further, the terminal STA-1 may receive an arbitrary frame from the terminal STA-3 connected to the third access point AP3, and acquire the RCPI, the RSNI, etc. from the received arbitrary frame.

When receiving the beacon request frame, the terminal STA-1 may generate the beacon report frame including the interference information (that is, the RCPI, the RSNI, etc.) with respect to the third access point AP3. The beacon report frame may include an average RCPI and an average RSNI with respect to the third access point AP3. Further, the beacon frame may include the RCPI and the RSNI with respect to the third access point AP3 which are more than a predetermined RCPI level and a predetermined RSNI level, respectively.

When receiving the measurement request frame, the terminal STA-1 may generate a measurement report frame including the interference information with respect to the station included in the BSS3. The measurement report frame may include the average RCPI and the average RSNI with respect to the station included in the BSS3. Further, the measurement report frame may include the RCPI and the RSNI with respect to the station included in the BSS3 which are more than the predetermined RCPI level and the predetermined RSNI level, respectively. A structure of the measurement report frame will be described below.

Figure 14:
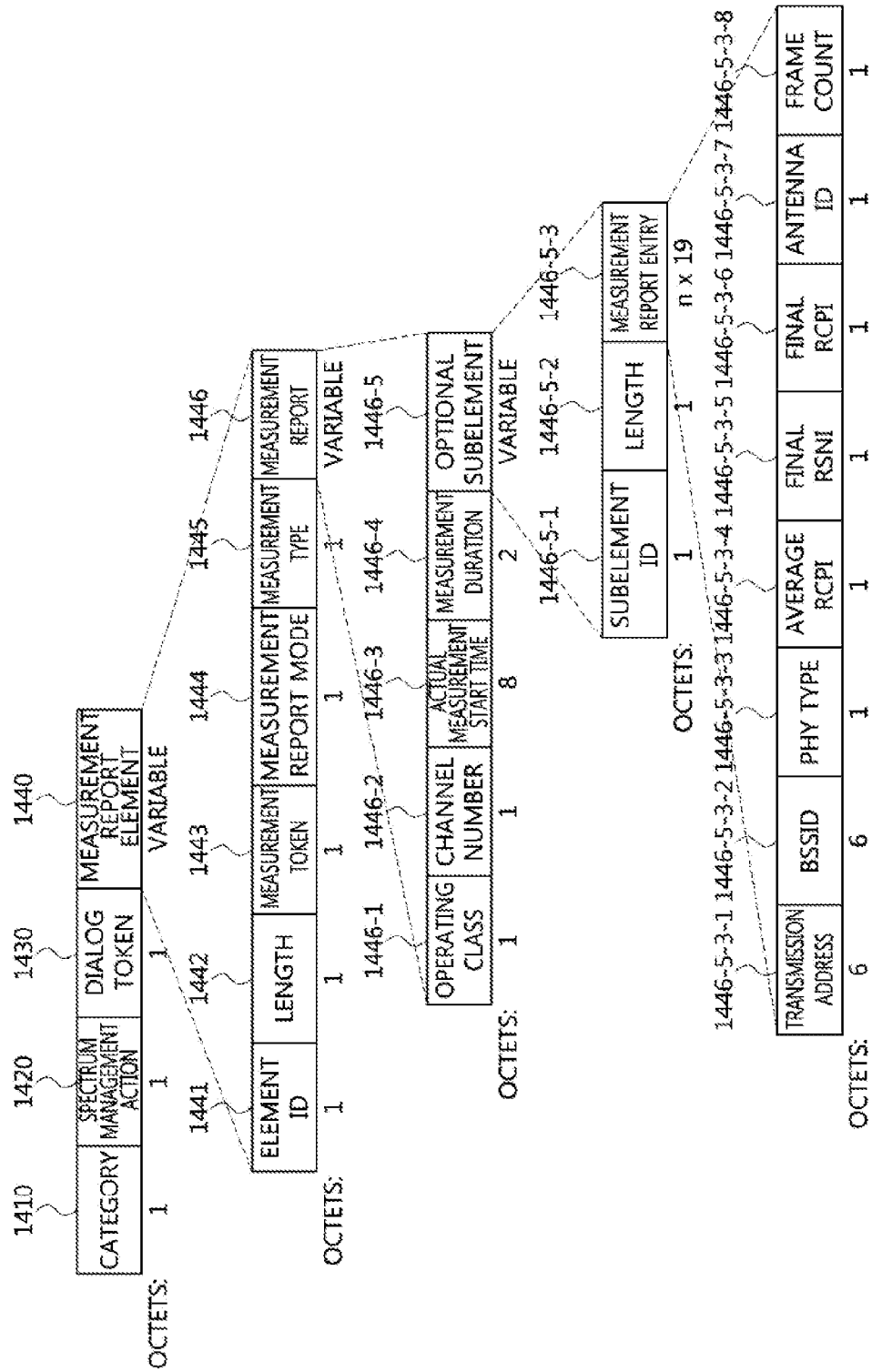
FIG. 14 is a diagram illustrating a structure of a measurement report frame according to an embodiment of the inventive concept.

FIG. 14 is a diagram illustrating a structure of a measurement report frame according to an embodiment of the inventive concept.

Referring to FIG. 14, a measurement report frame may include a category field 1410, a spectrum management action field 1420, a dialog token field 1430, and a measurement report element field 1440. The measurement report element field 1440 may include an element ID field 1441, a length field 1442, a measurement token field 1443, a measurement report mode field 1444, a measurement type field 1445, and a measurement report field 1446.

The measurement report field 1446 may include an operating class field 1446-1, a channel number field 1446-2, an actual measurement start time field 1446-3, a measurement duration field 1446-4, and an optional subelement field 1446-5. The optional subelement field 1446-5 may include a subelement ID field 1446-5-1, a length field 1446-5-2, and a measurement report entry field 1446-5-3.

The measurement report entry field 1446-5-3 may include a transmission address field 1446-5-3-1, a BSSID field 1446-5-3-2, a PHY type field 1446-5-3-3, an average RCPI field 1446-5-3-4, a final RSNI field 1446-5-3-5, a final RCPI field 1446-5-3-6, an antenna ID field 1446-5-3-7, and a frame count field 1446-5-3-8.

Here, the measurement report entry field 1446-5-3 may include interference measurement information with respect to at least one station. The measurement report entry field 1446-5-3 including the interference measurement information with respect to one station may have a size of 19 octets. For example, the measurement report entry field 1446-5-3 including the interference measurement information with respect to 10 stations may have a size of 19×10 octets. That is, the size of the measurement report entry field 1446-5-3 may be increased in proportion to the number of the stations, and thus the size of the measurement report frame may be increased.

A compressed measurement report frame may be used instead of the measurement report frame described with reference to FIG. 14. A structure of the compressed measurement report frame will be described below.

Figure 15:
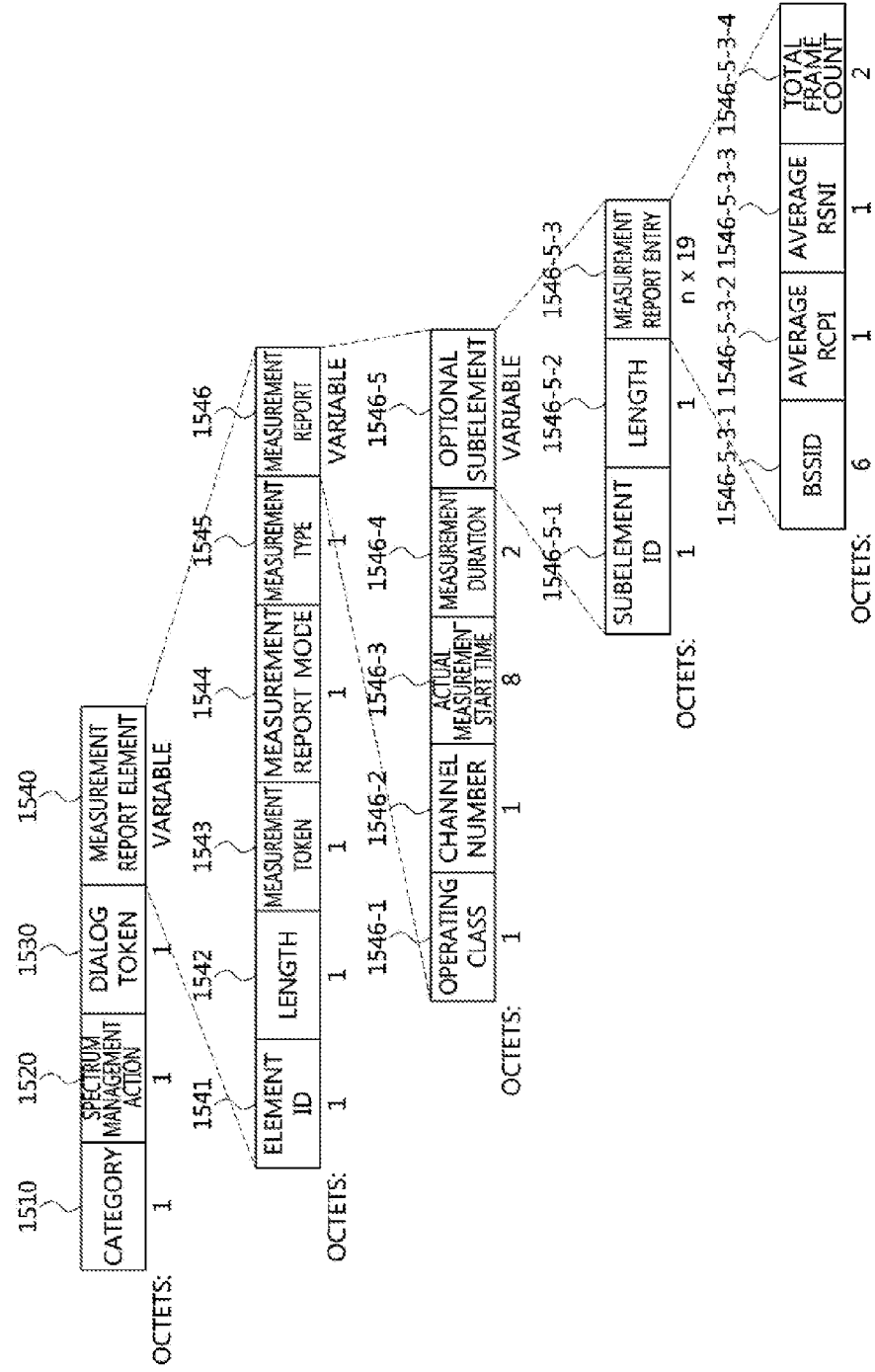
FIG. 15 is a diagram illustrating a structure of a compressed measurement report frame according to an embodiment of the inventive concept.

FIG. 15 is a diagram illustrating a structure of a compressed measurement report frame according to an embodiment of the inventive concept.

Referring to FIG. 15, a compressed measurement report frame may include a category field 1510, a spectrum management action field 1520, a dialog token field 1530, and a measurement report element field 1540. The measurement report element field 1540 may include an element ID field 1541, a length field 1542, a measurement token field 1543, a measurement report mode field 1544, a measurement type field 1545, and a measurement report field 1546. Here, an arbitrary one bit of the measurement report mode field 1544 may indicate whether a current frame is a compressed measurement report frame. For example, when the arbitrary one bit of the measurement report mode field 1544 is set as 0 which is a binary number, this may mean that the current frame is not the compressed measurement report frame. When the arbitrary one bit of the measurement report mode field 1544 is set as 1 which is a binary number, this may mean that the current frame is the compressed measurement report frame.

The measurement report field 1546 may include an operating class field 1546-1, a channel number field 1546-2, an actual measurement start time field 1546-3, a measurement duration field 1546-4, and an optional subelement field 1546-5. The optional subelememt field 1546-5 may include a subelement ID field 1546-5-1, a length field 1546-5-2, and a measurement entry field 1546-5-3.

The measurement report entry field 1546-5-3 may include a BSSID field 1546-5-3-1, an average RCPI field 1546-5-3-2, an average RSNI field 1546-5-3-3, and a total frame count field 1546-5-3-4.

Here, one measurement report entry field 1546-5-3 per BSS may be included in the compressed measurement report frame. That is, the average RCPI field 1546-5-3-2 of the measurement report entry field 1546-5-3 may indicate the average RCPI with respect to the stations included in the BSS specified by the BSSID field 1546-5-3-1. The average RSNI field 1546-5-3-3 of the measurement report entry field 1546-5-3 may indicate the average RSNI with respect to the stations included in the BSS specified by the BSSID field 1546-5-3-1. The total frame count field 1546-5-3-4 may indicate a total number of frames received from the stations included in the BSS specified by the BSSID field 1546-5-3-1 for the interference measurement.

Referring to FIGS. 9 and 10 again, the terminal STA-1 may transmit the beacon report frame or the measurement report frame (for example, the measurement report frame shown in FIG. 14, or the compressed measurement report frame shown in FIG. 15) to the first access point AP1.

The first access point AP1 may generate the interference information with respect to the BSS3 specified by the third access point AP3 based on information included in at least one of the beacon report frame and the measurement report frame received from the terminal STA-1 connected to first access point itself. The interference information with respect to the BSS3 may include the average RCPI with respect to the RCPI and the average RSNI with respect to the RSNI which are included in the beacon/measurement report frame. Further, the interference information with respect to the BSS3 may include the RCPI which is more than a predetermined RCPI level among the RCPIs and the RSNI which is more than a predetermined RSNI level among the RSNIs which are included in the beacon/measurement report frame.

The first access point AP1 may transmit the inter BSS measurement report frame including the interference information with respect to the BSS3 to the second access point AP2 (S1006). A structure of the inter BSS measurement report frame will be described below.

Figure 16:
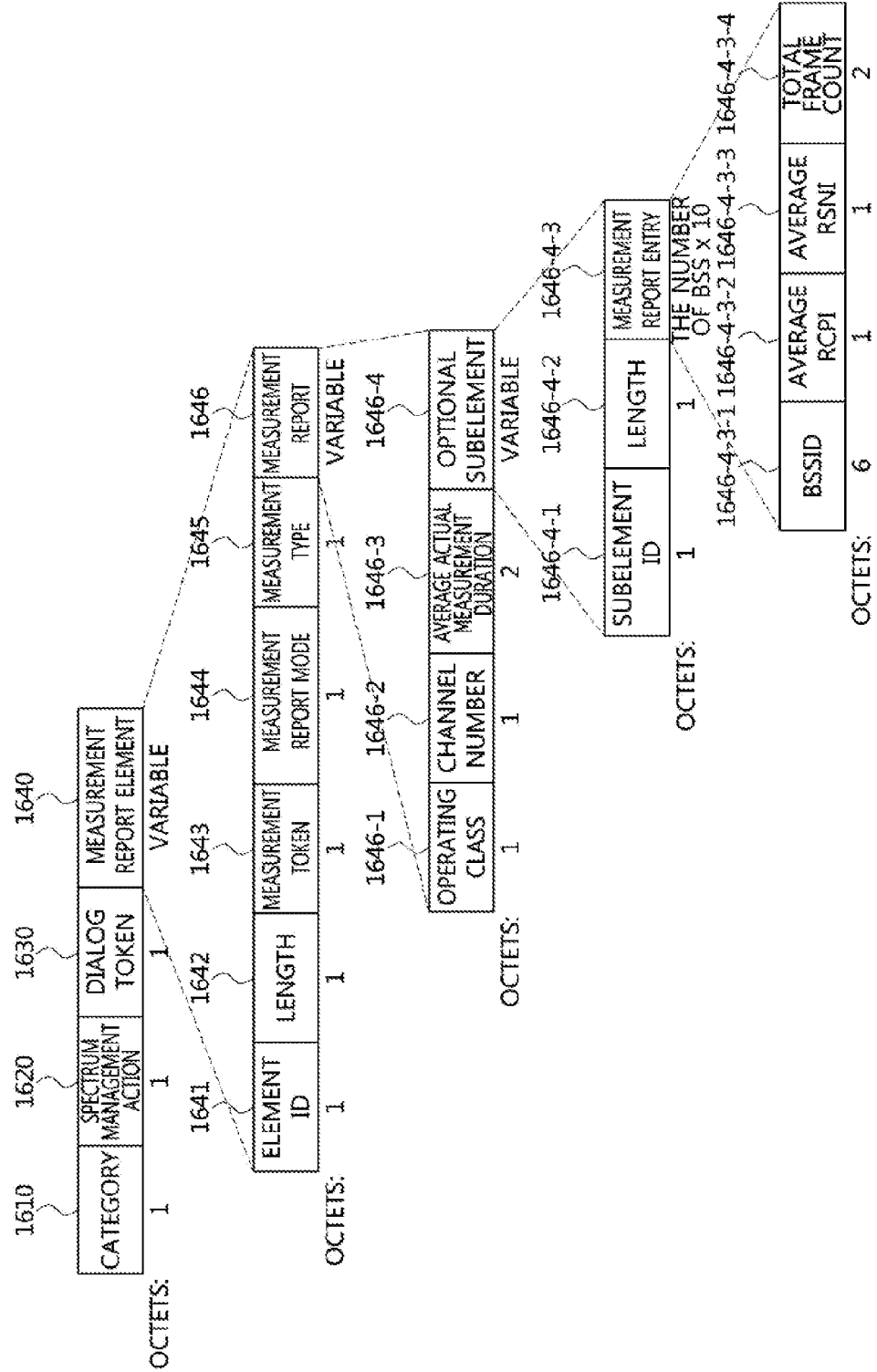
FIG. 16 is a diagram illustrating a structure of an inter BSS measurement report frame according to an embodiment of the inventive concept.

FIG. 16 is a diagram illustrating a structure of an inter BSS measurement report frame according to an embodiment of the inventive concept.

Referring to FIG. 16, an inter BSS measurement report frame may include a category field 1610, a spectrum management action field 1620, a dialog token field 1630, and a measurement report element field 1640. The measurement report element field 1640 may include an element ID field 1640, a length field 1642, a measurement token field 1643, a measurement report mode field 1644, a measurement type field 1645, and a measurement report field 1646.

The measurement report mode field 1644 may indicate whether a current frame is the inter BSS measurement report frame. For example, when an arbitrary one bit of the measurement report mode field 1644 is set as 0 which a binary number, this may mean that the current frame is not the inter BSS measurement report frame. When the arbitrary one bit of the measurement report mode field 1644 is set as 1 which a binary number, this may mean that the current frame is the inter BSS measurement report frame.

The measurement report field 1646 may include an operating class field 1646-1, a channel number field 1646-2, an average actual measurement duration field 1646-3, and an optional subelement field 1646-4. Here, the average actual measurement duration field 1646-3 may indicate an average time in which each terminal uses for measuring interference.

The optional subelement field 1646-4 may include a subelement ID field 1646-4-1, a length field 1646-4-2, and a measurement report entry field 1646-4-3. The measurement report entry field 1646-4-3 may include a BSSID field 1646-4-3-1, an average RCPI field 1646-4-3-2, an average RSNI field 1646-4-3-3, and a total frame count field 1646-4-3-4.

Here, one measurement report entry field 1646-4-3 per BSS may be included in the inter BSS measurement report frame. That is, the average RCPI field 1646-4-3-2 of the measurement report entry field 1646-4-3 may indicate the average RCPI with respect to the stations included in the BSS specified by the BSSID field 1646-4-3-1. The average RSNI field 1646-4-3-3 of the measurement report entry field 1646-4-3 may indicate the average RSNI with respect to the stations included in the BSS specified by the BSSID field 1646-4-3-1. The total frame count field 1646-4-3-4 may indicate a total number of frames received from stations included in the BSS specified by the BSSID field 1646-4-3-1 for the interference measurement.

Referring to FIGS. 9 and 10 again, the third access point AP3 may receive the inter BSS measurement request frame, and may recognize that the interference measurement with respect to the BSS1 established by the first access point APA based on the information included in the inter BSS measurement request frame is requested. In this case, the third access point AP3 may request the interference measurement with respect to the BSS1 to at least one terminal having the interference measurement function among the terminals connected to the third access point itself. The third access point AP3 may request the interference measurement with respect to the BSS1 by transmitting the beacon request frame or the measurement request frame to the terminal STA-3 connected to the third access point itself (S1004). Here, the operation S1004 may be the same as the operation S1002 described above.

When receiving the beacon request frame, the terminal STA-3 may measure the interference with respect to the first access point AP1, and transmit the beacon report frame including the measured result (that is, the RCPI, the RSNI, etc.) to the third access point AP3 (S1005). Further, when receiving the measurement request frame, the terminal STA-3 may measure the interference with respect to the first access point AP1 and the terminal STA-1 connected to the first access point AP1, and transmit the measurement report frame including the measured result (that is, the RCPI, the RSNI, etc.) to the third access point AP3 (S1005). Here, the operation S1005 may be the same as the operation S1003 described above.

The third access point AP3 may generate the interference information with respect to the BSS1 established by the first access point AP1 based on information included in the beacon/measurement report frame received from the terminal STA-3 connected to the third access point itself. The interference information with respect to the BSS1 may include an average RCPI with respect to the RCPIs and an average RSNI with respect to the RSNIs included in the beacon/measurement report frame. Further, the interference information with respect to the BSS1 may include the RCPI which is more than a predetermined RCPI level among the RCPIs and the RSNI which is more than a predetermined RSNI level among the RSNIs which are included in the beacon/measurement report frame.

The third access point AP3 may transmit the inter BSS measurement report frame including the interference information with respect to the BSS1 to the second access point AP2 (S1007). The inter BSS measurement report frame may be the same as the inter BSS measurement report frame described with respect to the FIG. 16.

In the method of measuring the inter BSS interference described above, the interference measurement with respect to the inter BSS is started by the request of the second access point AP2 which is the master access point. However, the interference measurement with respect to the inter BSS by each of the access points AP1 and AP2 which are under the channel coordination of the master access point may be started. The method of measuring the inter BSS interference started by each of the access points which are under the channel coordination of the master access point will be described below.

Figure 17:
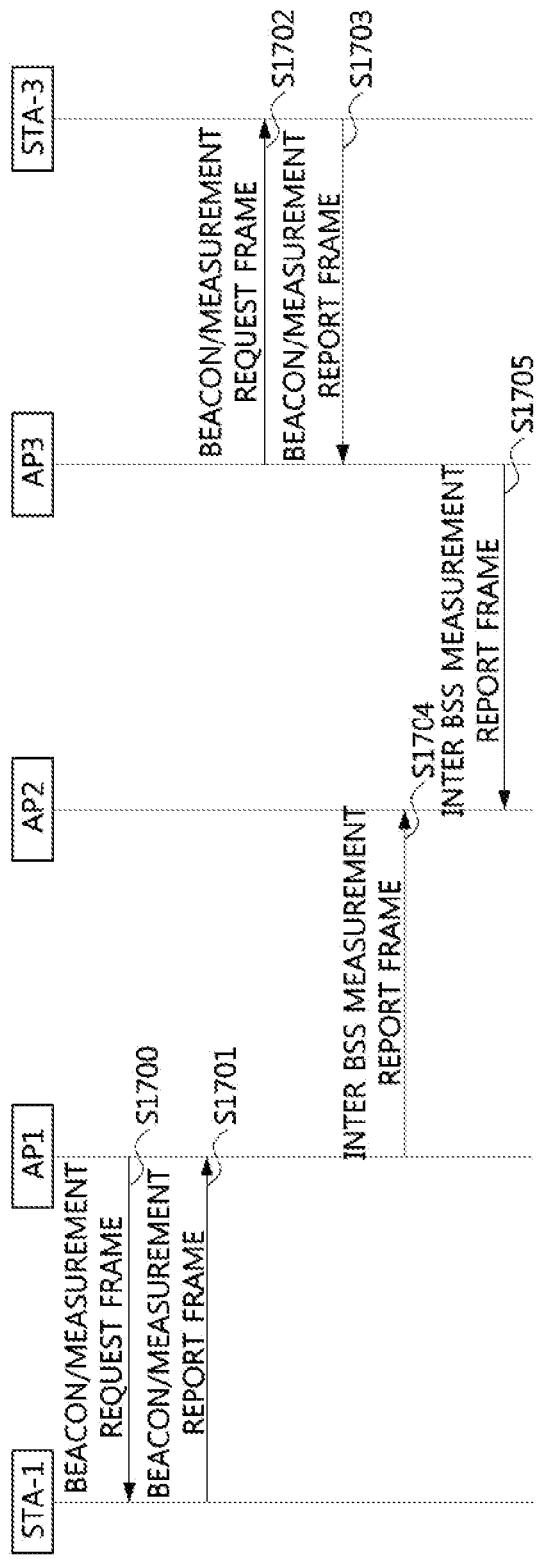
FIG. 17 is a diagram for describing a method of measuring inter BSS interference according to another embodiment of the inventive concept.

FIG. 17 is a diagram for describing a method of measuring inter BSS interference according to another embodiment of the inventive concept.

Referring to FIG. 17, the first access point AP1 may establish the BSS1. The second access point AP2 may establish the BSS2, and operate as the master access point M-AP. The second access point AP2 may perform channel coordination on the first and third access points AP1 and AP3. The third access point AP3 may establish the BSS3. The first and third access points AP1 and AP3 may be a hidden access point relationship. The first and third access points AP1 and AP3 may be located in the BSS2. That is, the second access point AP2 may communicate with the first and third access points AP1 and AP3.

The second access point AP2 may measure the interference in the WLAN, and change channels of the first and third access points AP1 and AP3 based on the measured result. The first access point AP1 may request the interference measurement with respect to the BSS3 by transmitting the beacon request frame or the measurement request frame to the terminal STA-1 connected to the second access point itself. When receiving the beacon request frame, the terminal STA-1 may measure the interference with respect to the third access point AP3, and transmit the beacon report frame including the measured result to the first access point AP1 (S1701). Further, when receiving the measurement request frame, the terminal STA-1 may measure the interference with respect to the third access point AP3 and the terminal STA-3 connected to the third access point AP3, and transmit the measurement report frame including the measured result to the first access point AP1 (S1701).

The first access point AP1 may generate interference measurement information with respect to the BSS3 based on information included in the beacon report frame and the measurement report frame, and transmit the inter BSS measurement report frame including the generated interference measurement information to the second access point AP2 (S1704). Here, the operation S1700 may be the same as the operation S1002 described with respect to FIG. 10, the operation S1701 may be the same as the operation S1003 described with respect to FIG. 10, and the operation S1704 may be the same as the operation S1006 described with respect to FIG. 10

Meanwhile, the third access point AP3 may request the interference measurement with respect to the first access point AP1 by transmitting the beacon request frame or the measurement request frame to the terminal STA-3 connected to the third access point itself (S1702). When receiving the beacon request frame, the terminal STA-3 may measure the interference with respect to the first access point AP1, and transmit the beacon report frame including the measured result to the third access point AP3 (S1703). Further, when receiving the measurement request frame, the terminal STA-3 may measure the interference with respect to the first access point AP1 and the terminal STA-1 connected to the first access point AP1, and transmit the measurement report frame including the measured result to the third access point AP3 (S1703).

The third access point AP3 may generate the interference measurement information with respect to the BSS3 based on the information included in the beacon report frame and the measurement report frame, and transmit the inter BSS measurement report frame including the generated interference measurement information to the second access point AP2 (S1705). Here, the operation S1702 may be the same as the operation S1004 described with reference to FIG. 10, the operation S1703 may be the same as the operation S1005 described with reference to FIG. 10, and the operation S1705 may be the same as the operation S1007 described with reference to FIG. 10.

Hereinafter, a method of changing a channel based on the interference measurement result with respect to the inter BSS will be described.

Figure 18:
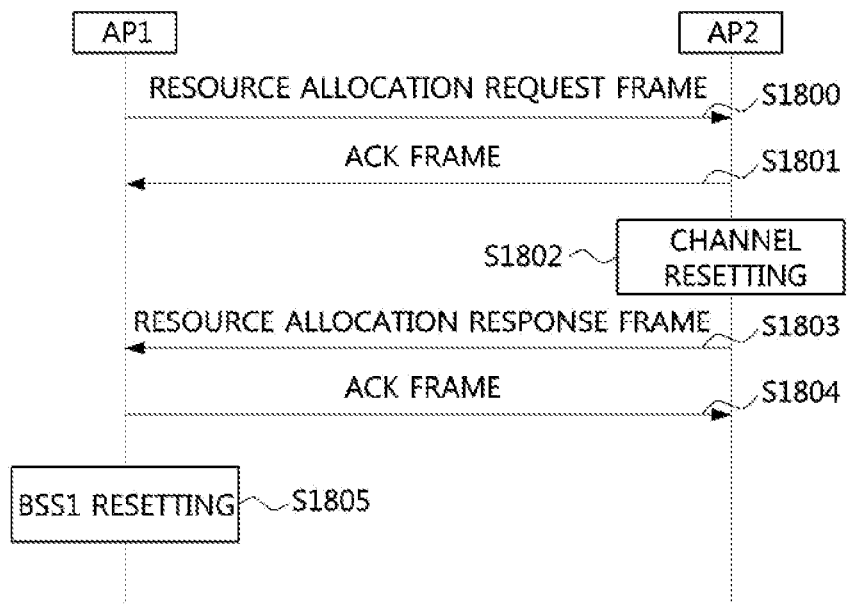
FIG. 18 is a diagram for describing a method of changing a channel according to one embodiment of the inventive concept.

FIG. 18 is a diagram for describing a method of changing a channel according to one embodiment of the inventive concept.

Referring to FIG. 18, a first access point AP1 may be the same as the first access point AP1 shown in FIGS. 9, 10, and 17. That is, the first access point AP1 may establish the BSS1. A second access point AP2 may be the same as the second access point AP2 shown in FIGS. 9, 10 and 17. That is, the second access point AP2 may establish the BSS2, and operate as the master access point.

Here, the method of changing the channel may be performed after the method of measuring the inter BSS interference described with reference to FIG. 10 or 17. When the interference from the inter BSS (for example, the third access point AP3) is increased, the first access point AP1 may request channel reallocation by transmitting the resource allocation request frame to the second access point AP2 (S1800). Here, the resource allocation request frame may be the same as the resource allocation request frame described with reference to FIG. 7. That is, the resource allocation request frame may include a channel candidate list.

The second access point AP2 may receive the resource allocation request frame, and transmit the ACK frame to the first access point AP1 after a SIFS from a reception end time point of the resource allocation request frame (S1801). When receiving the resource allocation request frame, the second access point AP2 may recognize that the channel reallocation with respect to the first access point AP1 is requested.

The second access point AP2 may determine whether to perform the channel reallocation with respect to the first access point AP1 based on the inter BSS measurement report frame received from the first access point AP1. For example, when the RCPI (or, the average RCPI) and/or the RSNI (or, the average RSNI) with respect to the BSS3 included in the inter BSS measurement report frame are more than the predetermined RCPI level and/or RSNI level, respectively, the second access point AP2 may determine to reallocate the channel of the first access point AP1. In this case, the second access point AP2 may reallocate the channel with respect to the first access point AP1 in the candidate channels included in the channel candidate list of the resource allocation request frame received from the first access point AP1 (S1802).

The second access point AP2 may generate a resource allocation response frame including the reallocated channel information. The resource allocation response frame may be the same as the resource allocation response frame shown in FIG. 8. The second access point AP2 may transmit the generated resource allocation response frame to the first access point AP1 (S1803).

When receiving the resource allocation response frame from the second access point AP2, the first access point AP1 may transmit an ACK frame after a SIFS from the reception end time point of the resource allocation response frame to the second access point AP2 (S1804). The first access point AP1 may reallocate the channel based on information included in the received resource allocation response frame (S1805).

Figure 19:
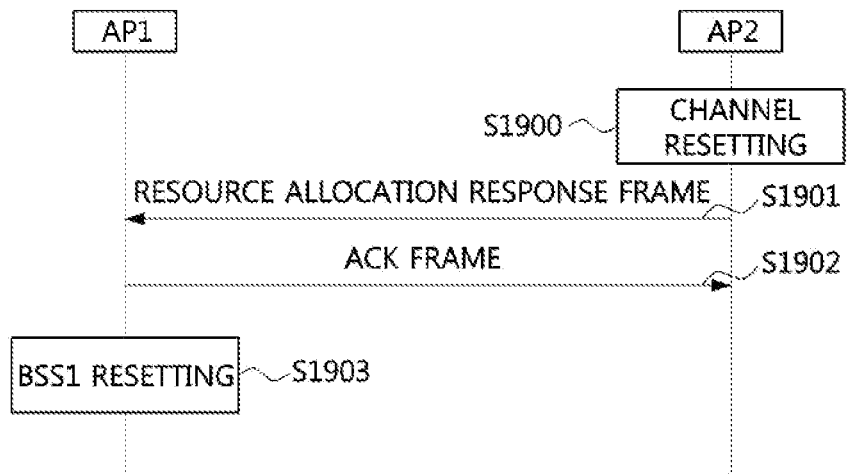
FIG. 19 is a diagram for describing a method of changing a channel according to another embodiment of the inventive concept.

FIG. 19 is a diagram for describing a method of changing a channel according to another embodiment of the inventive concept.

Referring to FIG. 19, a first access point AP1 may be the same as the first access point AP1 shown in FIGS. 9, 10, and 17. That is, the first access point AP1 may establish the BSS1. A second access point AP2 may be the same as the second access point AP2 shown in FIGS. 9, 10, and 17. That is, the second access point AP2 may establish the BSS2, and operates as the master access point.

Here, the method of changing the channel may be performed after the method of measuring the inter BSS interference described with reference to FIGS. 10 and 17. The second access point AP2 may determine whether to perform channel reallocation of the first access point AP1 based on the inter BSS measurement report frame received from the first access point AP1. For example, when the RCPI (or, the average RCPI) and/or the RSNI (or, the average RSNI) with respect to the BSS3 included in the inter BSS measurement report frame are more than the predetermined RCPI level and/or RSNI level, respectively, the second access point AP2 may determine to reallocate the channel of the first access point AP1. In this case, the second access point AP2 may reallocate the channel with respect to the first access point AP1 (S1900).

The second access point AP2 may generate a resource allocation response frame including the reallocated channel information. The resource allocation response frame may be the same as the resource allocation response frame shown in FIG. 8. The second access point AP2 may transmit the generated resource allocation response frame to the first access point AP1 (S1901).

When receiving the resource allocation response frame from the second access point AP2, the first access point AP1 may transmit an ACK frame to the second access point AP2 after a SIFS from the reception end time point of the resource allocation response frame (S1902). The first access point AP1 may reallocate the channel based on information included in the received resource allocation response frame (S1903).

Hereinafter, a result of comparing performance will be described when the measurement report frame shown in FIG. 14 is used and when the compressed measurement report frame shown in FIG. 15 is used.

Here, suppose that the number of access points which are the OBSS is k, and the master access point requests the interference measurement with respect to adjacent k−1 BSSs to the first access point AP1. Further, suppose that the first access point AP1 establishes the BSS1, and request the interference measurement with respect to the adjacent k−1 BSSs to m terminals included in the BSS1. Moreover, suppose that arbitrary 9 frames transmitted from the stations in each of the adjacent k−1 BSSs during the interference measurement period are acquired, and the acquired arbitrary frames are used for the interference measurement.

Size Reduction Ratio of Measurement Report Frame (1) Measurement report frame shown in FIG. 14

Measurement report entry field 1446-5-3: (k−1)×p×19 octets

Measurement report frame: 22+(k−1)×p×19 octets (2) Compressed measurement report frame shown in FIG. 15

Measurement report entry field 1546-5-3: (k−1)×10 octets

Measurement report frame: 22+(k−1)×10 octets

A compression ratio between the measurement report frame shown in FIG. 14 and the compressed measurement report frame shown in FIG. 15 is as follows.

$$\text{Compression ratio} = \{22+(k-1)\times10\}/\{22+(k-1)\times p\times19\}$$

For example, when k=5, m=10, and p=20, since the compress ratio is 66/1542, a size of the compressed measurement report frame shown in FIG. 15 may be about 4.3% of a size of the measurement report frame shown in FIG. 14.

Size Reduction Ratio of Inter BSS Measurement Report Frame (1) Inter BSS measurement report frame generated based on the measurement report frame shown in FIG. 14 received from each of the m terminals included in the BSS1

Measurement report entry field 1646-4-3: 14+(k−1)×p×19 octets

Inter BSS measurement report frame: 8+[14+(k−1)×p×19]×m octets (2) Inter BSS measurement report frame generated based on the compressed measurement report frame shown in FIG. 15 received from each of the m terminals included in the BSS1

Inter BSS measurement report frame: 14+(k−1)×10 octets

A compression ratio between the inter BSS measurement report frame generated based on the measurement report frame shown in FIG. 14 and the inter BSS measurement report frame generated based on the compressed measurement report frame shown in FIG. 15 is as follows.

$$\text{Compression ratio} = \{14+(k-1)\times10\}/\{8+[14+(k-1)\times p\times 19]\times m\}$$

For example, when k=5, m=10, and p=20, since the compress ratio is 54/15348, a size of the inter BSS measurement report frame generated based on the compressed measurement report frame shown in FIG. 15 may be about 0.35% of a size of the inter BSS measurement report frame generated based on the measurement report frame shown in FIG. 14.

That is, the size of the inter BSS measurement report frame generated based on the compressed measurement report frame shown in FIG. 15 may be reduced by 1/(m×p) compared with the size of the inter BSS measurement report frame generated based on the measurement report frame shown in FIG. 14.

According to the inventive concept, the performance of the WLAN can be improved.

Exemplary embodiments of the inventive concept may be recorded in a computer-readable record medium by being implemented in the form of program instructions which are executable using various computer components. The computer-readable record medium may include program instructions, data files, data structures, etc., alone or in combination. The program instructions recorded in the computer-readable record medium may be specially designed for the inventive concept, or may be known to those skilled in the art of the computer software field.

Examples of the computer-readable record medium may include a hardware device, which is specially configured to store and execute the program instructions, such as a floptical disk, a read only memory (ROM), a random access memory (RAM), a flash memory, etc. The hardware device may be configured to operate as one or more software modules to perform the method according to exemplary embodiments of the inventive concept, and vice versa. Examples of the program instructions may include mechanical codes which are made by a compiler, and high-level language codes which are executable by a computer using an interpreter, etc.

While the example embodiments of the inventive concept and their advantages have been described in detail, it should be understood that various changes, substitutions, and alterations may be made herein without departing from the scope of the invention.

What is claimed is:

1. A method of configuring a basic service set (BSS) performed by a first access point, the method comprising:
   detecting at least one adjacent access point;
   determining candidate channel information based on channel information of the at least one adjacent access point so as to reduce interference from the at least one adjacent access point;
   generating a resource allocation request frame including the candidate channel information;
   transmitting the resource allocation request frame to a master access point among the at least one adjacent access point;
   receiving, in response to the resource allocation request frame, a resource allocation response frame including channel related information from the master access point; and
   configuring the BSS based on the channel related information included in the resource allocation response frame.

2. The method of claim 1, wherein the detecting of the at least one adjacent access point comprises:
   transmitting, to the at least one adjacent access point, a probe request frame; and
   receiving, from the at least one adjacent access point, a probe response frame in response to the probe request frame, wherein the probe response frame includes at least one among an identifier, operating channel information, primary channel information, and information indicating whether to operate as the master access point.

3. The method of claim 1, wherein the detecting of the at least one adjacent access point comprises:
   receiving, from the at least one adjacent access point, a beacon frame including at least one among an identifier, operating channel information, primary channel information, and information indicating whether to operate as the master access point.

4. The method of claim 1, wherein the candidate channel information comprises at least one among operating channel information, primary channel information, and center frequency information which the first access point wants.

5. The method of claim 1, wherein the channel related information comprises at least one among operating channel information, primary channel information, and center frequency information of the first access point determined by the master access point.

6. A method of reallocating a channel performed by a first access point belonging to a first basic service set (BSS), the method comprising:
   receiving, from a second access pint, an inter BSS measurement request frame requesting interference measurement with respect to a second BSS which is overlapped with the first BSS;
   requesting, to at least one terminal connected to the first access point, the interference measurement with respect to the second BSS, wherein the at least one terminal is located in an overlapping region between the first BSS and the second BSS;
   receiving, from the at least one terminal, interference information with respect to the second BSS, wherein the interference information is measured by the at least one terminal; and
   transmitting, to the second access point, an inter BSS response frame including the interference information with respect to the measured second BSS.

7. The method of claim 6, wherein the inter BSS measurement request frame comprises identification information of an arbitrary access point establishing the second BSS.

8. The method of claim 6, wherein the interference information with respect to the second BSS comprises at least one among interference information with an arbitrary access point establishing the second BSS and interference information with respect to at least one terminal included in the second BSS.

9. The method of claim 6, wherein the interference information with respect to the second BSS comprises at least one among an average received channel power indicator (RCPI) and an average receive signal to noise indicator (RSNI) with respect to the second BSS.

10. The method of claim 6, wherein the interference information with respect to the second BSS comprises at least one among an RCPI with respect to the second BSS which has a level greater than a predetermined RCPI level and an RSNI with respect to the second BSS which has a level greater than a predetermined RSNI level.

11. The method of claim 6, further comprising:
   transmitting, to the second access point, a resource allocation request frame requesting channel reallocation;
   receiving, from the second access point, a resource allocation response frame including reallocated channel related information based on the interference information with respect to the second BSS; and reallocating the channel based on the channel related information included in the resource allocation response frame.

12. The method of claim 11, wherein the channel related information comprises at least one among operating channel information, primary channel information, and center frequency information of the first access point determined by the second access point.

13. The method of claim 6, further comprising:
receiving, from the second access point, a resource allocation response frame including reallocated channel related information based on the interference information with respect to the second BSS; and
reallocating the channel based on the channel related information included in the resource allocation response frame.

14. A method of reallocating a channel performed by a first access point belonging to a first basic service set (BSS), the method comprising:
requesting, to at least one terminal connected to the first access point, interference measurement with respect to a second BSS which is overlapped with the first BSS, wherein the at least one terminal is located in an overlapping region between the first BSS and the second BSS;
receiving, from the at least one terminal, interference information with respect to the second BSS, wherein the interference information is measured by the at least one terminal; and
transmitting, to a second access point, an inter BSS measurement response frame including the interference information with respect to the measured second BSS.

15. The method of claim 14, wherein the interference information with respect to the second BSS comprises at least one among interference information with respect to an arbitrary access point establishing the second BSS and interference information with respect to at least one terminal included in the second BSS.

16. The method of claim 14, wherein the interference information with respect to the second BSS comprises at least one among an average received channel power indicator (RCPI) and an average receive signal to noise indicator (RSNI) with respect to the second BSS.

17. The method of claim 14, wherein the interference information with respect to the second BSS comprises at least one among an RCPI with respect to the second BSS which has a level greater than a predetermined RCPI level and an RSNI with respect to the second BSS which has a level greater than a predetermined RSNI level.

18. The method of claim 14, further comprising:
transmitting, to the second access point, a resource allocation request frame requesting channel reallocation;
receiving, from the second access point, a resource allocation response frame including reallocated channel related information based on the interference information with respect to the second BSS; and
reallocating the channel based on the channel related information included in the resource allocation response frame.

19. The method of claim 18, wherein the channel related information comprises at least one among operating channel information, primary channel information, and center frequency information of the first access point determined by the second access point.

20. The method of claim 14, further comprising:
receiving, from the second access point, a resource allocation response frame including reallocated channel related information based on the interference information with respect to the second BSS; and
reallocating the channel based on the channel related information included in the resource allocation response frame.

* * * * *